(12) United States Patent
Bansal et al.

(10) Patent No.: US 10,606,709 B1
(45) Date of Patent: Mar. 31, 2020

(54) METHOD AND SYSTEM FOR INTELLIGENTLY LOAD BALANCING DATABASE BACKUP OPERATIONS IN INFORMATION TECHNOLOGY ENVIRONMENTS

(71) Applicant: EMC IP Holding Company LLC, Hopkinton, MA (US)

(72) Inventors: Aaditya Rakesh Bansal, Bangalore (IN); Tushar B. Dethe, Bangalore (IN)

(73) Assignee: EMC IP Holding Company LLC, Hopkinton, MA (US)

( * ) Notice: Subject to any disclaimer, the term of this patent is extended or adjusted under 35 U.S.C. 154(b) by 47 days.

(21) Appl. No.: 16/171,817

(22) Filed: Oct. 26, 2018

(51) Int. Cl.
*G06F 11/14* (2006.01)
*G06F 9/50* (2006.01)
*H04L 29/08* (2006.01)
*G06F 16/21* (2019.01)

(52) U.S. Cl.
CPC ........ *G06F 11/1464* (2013.01); *G06F 9/5072* (2013.01); *G06F 11/1451* (2013.01); *G06F 11/1469* (2013.01); *G06F 16/21* (2019.01); *H04L 67/1008* (2013.01); *G06F 2201/80* (2013.01)

(58) Field of Classification Search
CPC .............. G06F 11/1464; G06F 9/5072; G06F 11/1451; G06F 11/1469; G06F 2201/80; G06F 9/50; G06F 16/21; G06F 16/27; H04L 67/1008
See application file for complete search history.

(56) References Cited

U.S. PATENT DOCUMENTS

2018/0365110 A1* 12/2018 Venkatesh ........... G06F 11/1458

* cited by examiner

*Primary Examiner* — Idriss N Alrobaye
*Assistant Examiner* — Richard B Franklin
(74) *Attorney, Agent, or Firm* — Chamberlain, Hrdlicka, White, Williams & Aughtry

(57) ABSTRACT

A method and system for intelligently load balancing database backup operations in information technology (IT) environments. Specifically, the method and system disclosed herein may be directed to breaking down any given database backup operation into various constituent backup operation stages. Further, each successive backup operation stage of the various backup operation stages may be performed on an appropriate client node in a cluster of client nodes through load balancing orchestration. Selection of the appropriate client node to perform a given backup operation stage may be determined at least based on an availability of resources for performing database backup operations on the client node versus the availability of resources on other client nodes in the cluster.

20 Claims, 32 Drawing Sheets

System 100

METHOD AND SYSTEM FOR INTELLIGENTLY LOAD BALANCING DATABASE BACKUP OPERATIONS IN INFORMATION TECHNOLOGY ENVIRONMENTS

BACKGROUND

Database backup operations are often resource intensive processes, which consume a substantial amount of computing resources available on any given server.

DETAILED DESCRIPTION

Figure 1A:
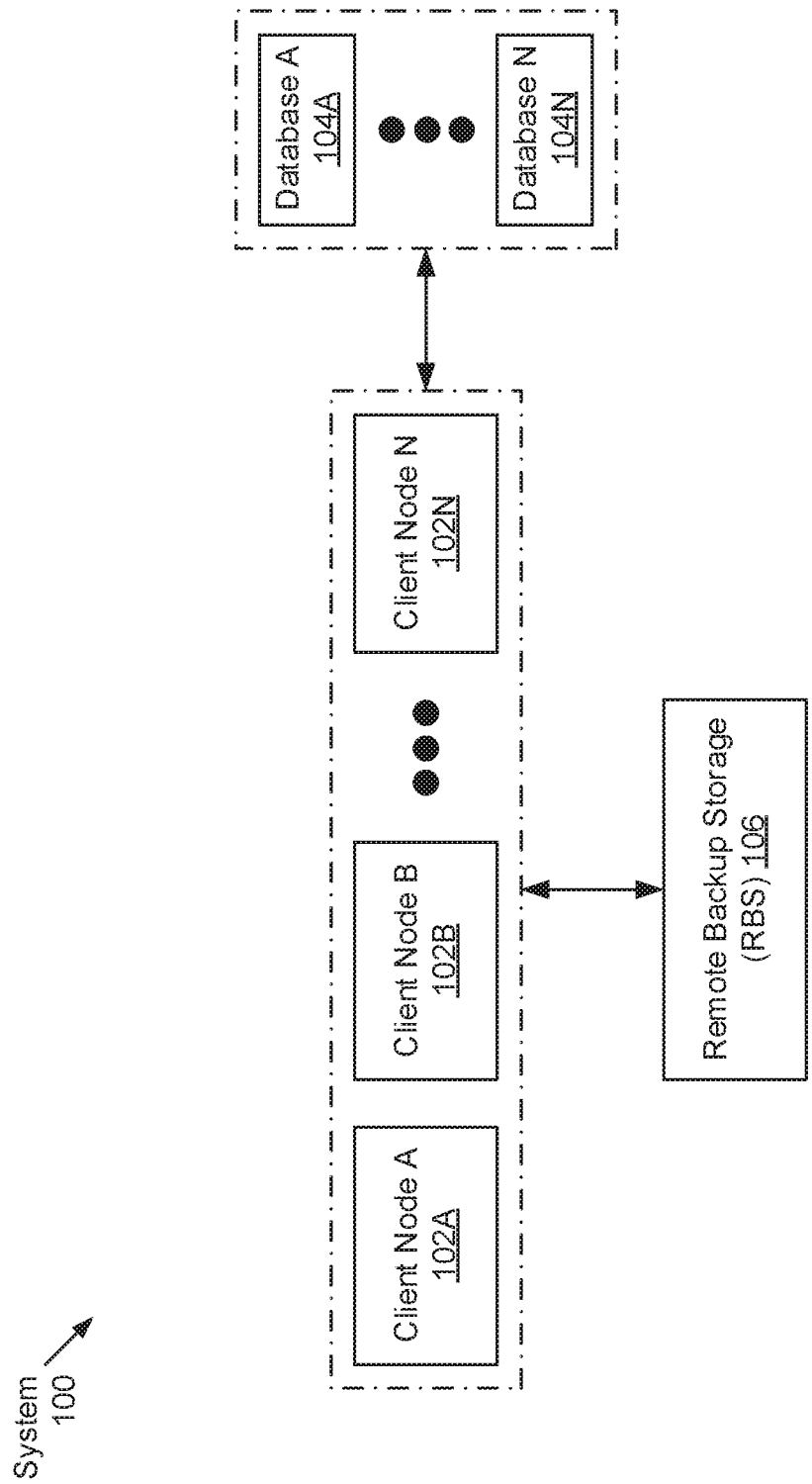
FIG. 1A shows a system in accordance with one or more embodiments of the invention.

Specific embodiments of the invention will now be described in detail with reference to the accompanying figures. In the following detailed description of the embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

In the following description of FIGS. 1A-12E, any component described with regard to a figure, in various embodiments of the invention, may be equivalent to one or more like-named components described with regard to any other figure. For brevity, descriptions of these components will not be repeated with regard to each figure. Thus, each and every embodiment of the components of each figure is incorporated by reference and assumed to be optionally present within every other figure having one or more like-named components. Additionally, in accordance with various embodiments of the invention, any description of the components of a figure is to be interpreted as an optional embodiment which may be implemented in addition to, in conjunction with, or in place of the embodiments described with regard to a corresponding like-named component in any other figure.

Throughout the application, ordinal numbers (e.g., first, second, third, etc.) may be used as an adjective for an element (i.e., any noun in the application). The use of ordinal numbers is not to necessarily imply or create any particular ordering of the elements nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and a first element may encompass more than one element and succeed (or precede) the second element in an ordering of elements.

In general, embodiments of the invention relate to a method and system for intelligently load balancing database backup operations in information technology (IT) environments. Specifically, one or more embodiments of the invention may be directed to breaking down any given database backup operation into various constituent backup operation stages. Further, each successive backup operation stage of the various backup operation stages may be performed on an appropriate client node in a cluster of client nodes through load balancing orchestration. Selection of the appropriate client node to perform a given backup operation stage may be determined at least based on an availability of resources for performing database backup operations on the client node versus the availability of resources on other client nodes in the cluster.

When a database backup operation is instantiated on a server (i.e., client node), the database backup operation tends to consume a substantial amount of the available resources on the server. In consuming a substantial amount of the available resources, the performance of the server (in supporting the execution of other tasks) is crippled. Embodiments of the invention subsequently address this dilemma by, first, separating any given database backup operation into several backup operation stages; and, second, assigning the workload involved in performing each backup operation stage to an appropriate client node (i.e., of two or more client nodes forming a load balancing cluster) that exhibits the most available resources at the point-in-time during which the respective backup operation stage is next to be performed. In load balancing database backup operations in this manner, one or more embodiments of the invention: mitigate the targeted performance hit to a single server for the entirety of a database backup operation; removes the need for administrators to implement fixed time schedules reserved for the processing of database backup operations; and removes the need for administrators to explicitly deploy new servers, which would be solely responsible for performing database backup operations. Other advantages embodiments of the invention include, but are not limited to: facilitating smaller backup windows for the completion of database backup operations; minimizing the probability of backup failure on account of data transfer; minimizing the probability of backup failure on account of resource crunch on any particular server; and continuing database backup operations despite the failover of one or more client nodes forming the load balancing cluster.

FIG. 1A shows a system in accordance with one or more embodiments of the invention. The system (100) may include two or more client nodes (102A-102N), one or more databases (104A-104N), and a remote backup storage (RBS) (106). Each of these components is described below.

In one embodiment of the invention, the above-mentioned components may be directly or indirectly connected to one another through a network (not shown) (e.g., a local area network (LAN), a wide area network (WAN) such as the Internet, a mobile network, etc.). The network may be implemented using any combination of wired and/or wireless connections. In embodiments in which the above-mentioned components are indirectly connected, there may be other networking components or systems (e.g., switches, routers, gateways, etc.) that facilitate communications, information exchange, and/or resource sharing. Further, the above-mentioned components may communicate with one another using any combination of wired and/or wireless communication protocols.

Figure 10:
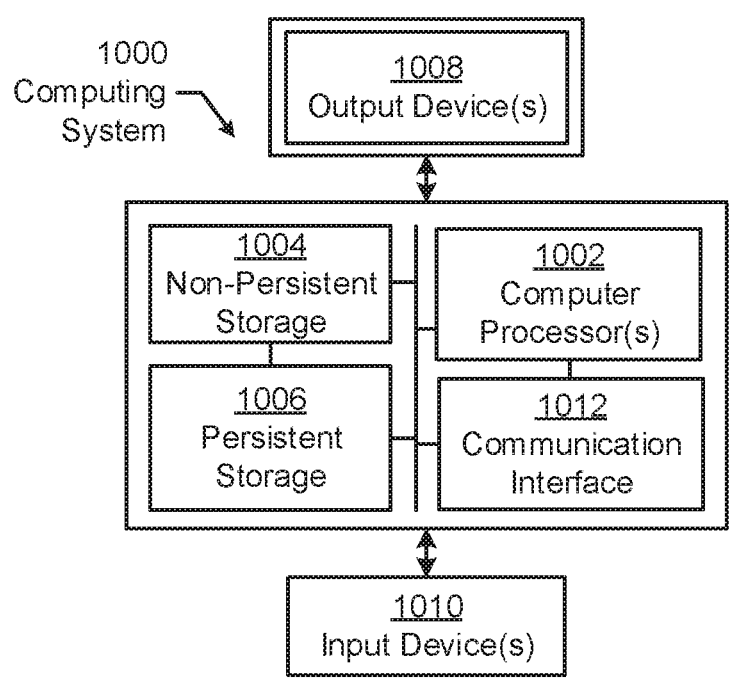
FIG. 10 shows a computing system in accordance with one or more embodiments of the invention.

In one embodiment of the invention, each client node (102A-102N) may represent an appliance—e.g., a server, which may be a physical server that may reside in a datacenter or a virtual server that may reside in a cloud computing environment; or any computing system similar to the exemplary computing system shown in FIG. 10. Each client node (102A-102N) may include functionality to generate, send, receive, and process requests and replies, either locally or over a network. Further, collectively, the two or more client nodes (102A-102N) may form a load balancing cluster (not shown) or a group of linked nodes that work together to implement one or more applications and/or services. In one embodiment of the invention, the two or more client nodes (102A-102N) may work together to intelligently and efficiently load balance database backup operations. One of ordinary skill will appreciate that each client node (102A-102N) may perform other functionalities without departing from the scope of the invention. Client nodes (102A-102N) are described in further detail below with respect to FIG. 1B.

In one embodiment of the invention, each database (104A-104N) may represent a local repository for the organization and consolidation of various forms of information pertinent to the two or more client nodes (102A-102N). Each database (104A-104N) may span logically across one or more physical storage devices and/or media (not shown), which may or may not be of the same type or co-located at a same physical site. Further, information consolidated in each database (104A-104N) may be arranged using any storage mechanism (e.g., a filesystem, a collection of tables or records, etc.). In one embodiment of the invention, each database (104A-104N) may be implemented using persistent (i.e., non-volatile) storage. Examples of persistent storage include, but are not limited to, optical storage, magnetic storage, NAND Flash Memory, NOR Flash Memory, Magnetic Random Access Memory (M-RAM), Spin Torque Magnetic RAM (ST-MRAM), Phase Change Memory (PCM), or any other storage media defined as non-volatile Storage Class Memory (SCM).

In one embodiment of the invention, the RBS (106) may represent a data backup, archiving, and/or disaster recovery storage system. The RBS (106) may be implemented using one or more servers (not shown). Each server may be a physical server (i.e., which may reside in a datacenter) or a virtual server (i.e., which may reside in a cloud computing environment). In one embodiment of the invention, the RBS (106) may be implemented using one or more computing systems similar to the exemplary computing system shown in FIG. 10. Further, the RBS (106) may include functionality to: receive target database snapshots from the various client nodes (102A-102N); and consolidate these received target database snapshots within a collection of one or more physical storage devices and/or media (not shown) further constituting the RBS (106). A target database snapshot may refer to an exact image-based copy of at least a portion of the various forms of information stored in a database (104A-104N). Moreover, one of ordinary skill will appreciate that the RBS (106) may perform other functionalities without departing from the scope of the invention.

While FIG. 1A shows a configuration of components, other system configurations may be used without departing from the scope of the invention.

Figure 1B:
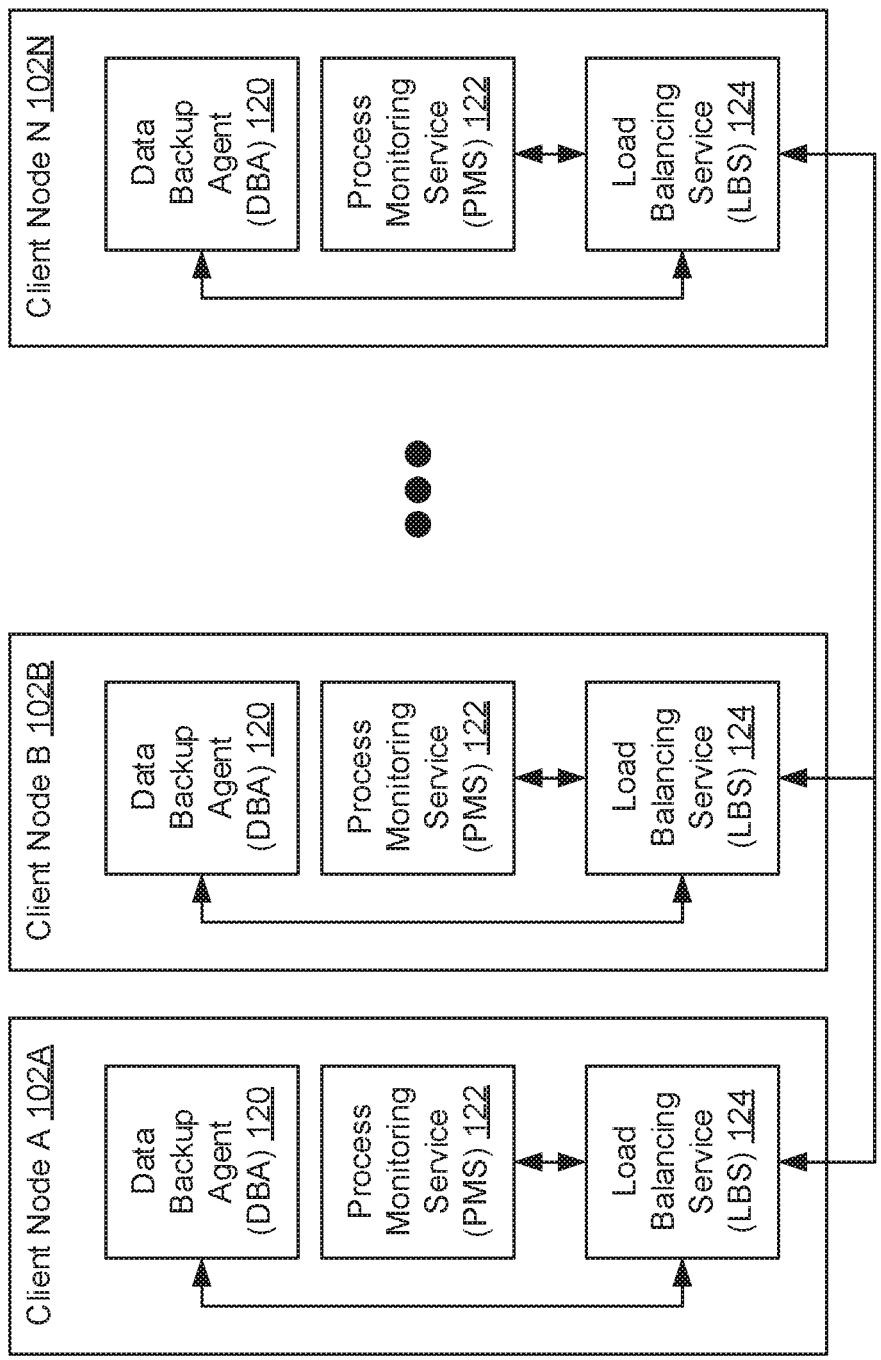
FIG. 1B shows client nodes in accordance with one or more embodiments of the invention.

FIG. 1B shows client nodes in accordance with one or more embodiments of the invention. As mentioned above, various client nodes (102A-102N) may represent appliances that collectively form a load balancing cluster (not shown), which may work together to implement one or more applications and/or services. In one embodiment of the invention, these various client nodes (102A-102N) may work together to intelligently and efficiently load balance database backup operations. To that extent, each client node (102A-102N) may include a data backup agent (DBA) (120) operatively connected to a load balancing service (LBS) (124), which in turn may be operatively connected to a process monitoring service (PMS) (122) and one or more other (remote) LBSs (124) residing on one or more other (remote) client nodes (102A-102N). Each of these client node subcomponents is described below.

In one embodiment of the invention, the DBA (120) may be a computer program or process (i.e., an instance of a computer program) that executes on the underlying hardware of the client node (102A-102N). Specifically, the DBA (120) may be a computer program or process tasked with, at least in part, managing data backup and recovery operations on the client node (102A-102N). To that extent, the DBA (120) may include functionality to: receive and process database backup initialization instructions in accordance with embodiments of the invention (see e.g., FIG. 4); and receive and process backup operation stage packages in accordance with one or more embodiments of the invention (see e.g., FIG. 5). One of ordinary skill will appreciate that the DBA (120) may perform other functionalities without departing from the scope of the invention.

In one embodiment of the invention, the PMS (122) may be a computer program or process (i.e., an instance of a computer program) that executes on the underlying hardware of the client node (102A-102N). Specifically, the PMS (122) may be a computer program or process tasked with, at least in part, determining protection availability indices (PAIs) for the client node (102A-102N). To that extent, the PMS (122) may include functionality to: collect backup critical parameters (BCPs) (described below) and compute PAIs using at least the BCPs in accordance with one or more embodiments of the invention (see e.g., FIG. 6). One of ordinary skill will appreciate that the PMS (122) may perform other functionalities without departing from the scope of the invention.

In one embodiment of the invention, the LBS (124) may be a computer program or process (i.e., an instance of a computer program) that executes on the underlying hardware of the client node (102A-102N). Specifically, the LBS (124) may be a computer program or process tasked with, at least in part, and in concert with other (remote) LBSs (124) on other (remote) client nodes (102A-102N), orchestrate the load balancing of data backup and recovery operations across the load balancing cluster (not shown). To that extent, the LBS (124) may include functionality to: receive and process backup continuation queries in accordance with one or more embodiments of the invention (see e.g., FIG. 7); receive and process remote index queries in accordance with one or more embodiments of the invention (see e.g., FIG. 8); receive and process backup operation stage packages in accordance with one or more embodiments of the invention (see e.g., FIG. 9); and maintain a global load distribution table (GLDT) (see e.g., FIG. 3) in relation to orchestrating the load balancing of data backup and recovery operations across the load balancing cluster. One of ordinary skill will appreciate that the LBS (124) may perform other functionalities without departing from the scope of the invention.

While FIG. 1B shows a configuration of subcomponents, other client node subcomponents may exist without departing from the scope of the invention.

Figure 2:
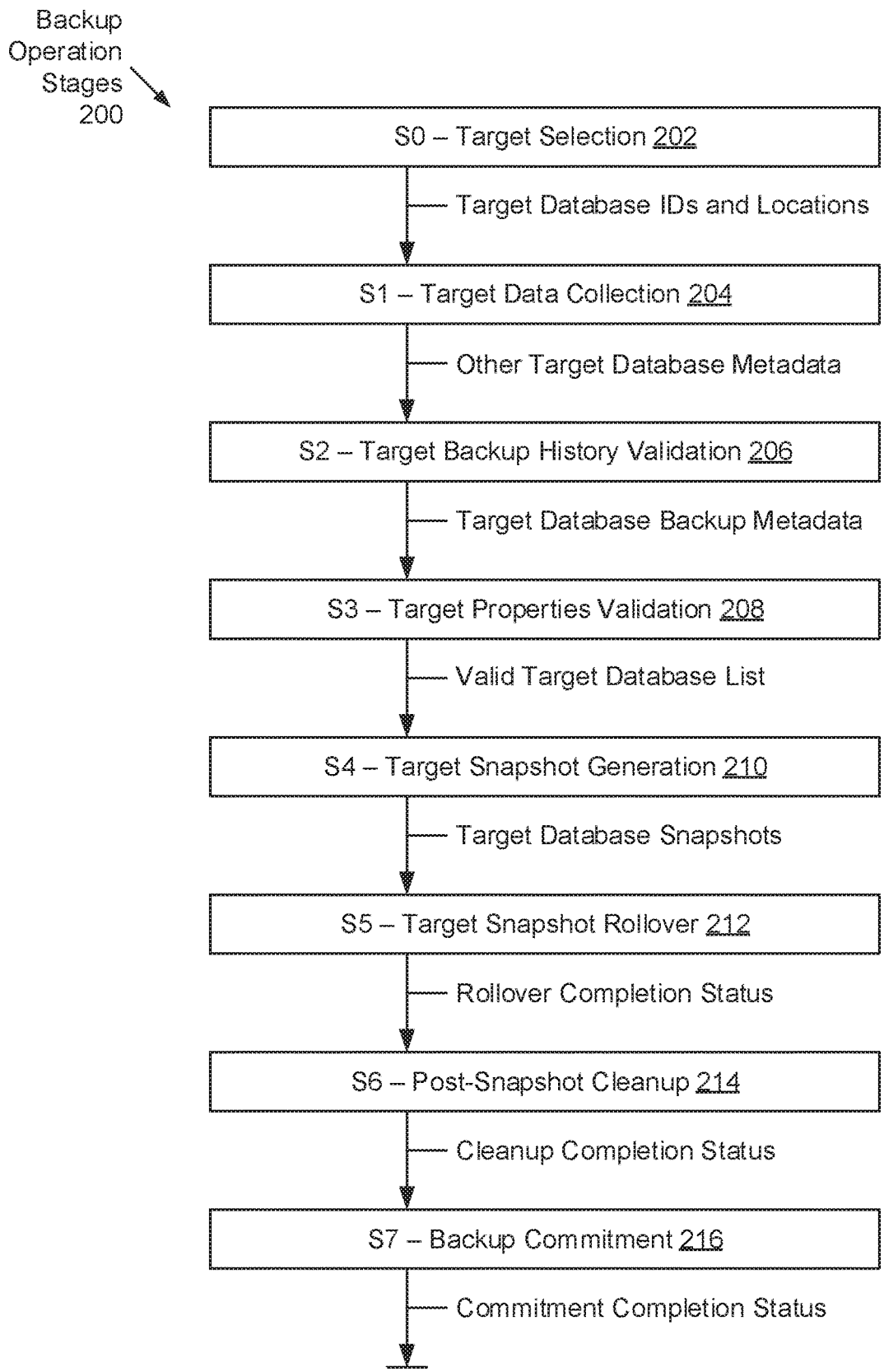
FIG. 2 shows backup operation stages in accordance with one or more embodiments of the invention.

FIG. 2 shows backup operation stages in accordance with one or more embodiments of the invention. The various backup operation stages (200) outlined below, when performed in the presented sequential order, may constitute a single complete database backup operation. The various backup operation stages (200) include, but are not limited to: (i) Stage 0 (S0)—target selection (202); (ii) Stage 1 (S1)—target data collection (204); (iii) Stage 2 (S2)—target backup history validation (206); (iv) Stage 3 (S3)—target properties validation (208); (v) Stage 4 (S4) target snapshot generation (210); (vi) Stage 5 (S5)—target snapshot rollover (212); (vii) Stage 6 (S6)—post-snapshot cleanup (214); and (viii) Stage 7 (S7)—backup commitment (216). Each of these backup operations stages (200) is described below.

In one embodiment of the invention, the Stage 0 (S0) (202) backup operation stage of any given database backup operation may be directed to target selection. In this backup operation stage, the process(es) that may be performed may include, but is/are not limited to: obtaining or identifying a target database ID and/or target database location for each target database to which the given database backup operation is directed. A target database ID may refer to a string of characters (e.g., letters, numbers, symbols, etc.) that may uniquely identify a given target database. A target database location may refer to a string of characters (e.g., letters, numbers, symbols, etc.) that may specify a unique location in a filesystem (i.e., a path) hierarchy at which a given target database resides. Furthermore, the output(s) of this backup operation stage, which may be yielded from performing the aforementioned process(es), may include, but is/are not limited to: one or more target database IDs and/or one or more target database locations associated with one or more target databases, respectively.

In one embodiment of the invention, the Stage 1 (S1) (204) backup operation stage of any given database backup operation may be directed to target data collection. In this backup operation stage, the process(es) that may be performed may include, but is/are not limited to: obtaining various target database pertinent data points describing or associated with each target database to which the given database backup operation is directed. Examples of target database pertinent data points include, but are not limited to, target database size, target database type, target database configuration, target database schema, target database compression type, target database creation or last modified date, etc. Furthermore, the input(s) of this backup operation stage, which may be used in performing the aforementioned process(es), may at least include the above-outlined output(s) of the Stage 0 (S0) backup operation stage of the given database backup operation. Moreover, the output(s) of this backup operation stage, which may be yielded from performing the aforementioned process(es), may include, but is/are not limited to: one or more sets of target database metadata (i.e., target database pertinent data points) associated with one or more target databases, respectively.

In one embodiment of the invention, the Stage 2 (S2) (206) backup operation stage of any given database backup operation may be directed to target backup history validation. In this backup operation stage, the process(es) that may be performed may include, but is/are not limited to: obtaining a backup history or chain for each target database to which the given database backup operation is directed. A backup history/chain may refer to a sequence of backups that may record the appropriate order in which initial information in and changes to a given target database should be sequenced to guarantee a proper restoration of the given target database. A backup history/chain may include one or more backups, which may specify a full backup followed by zero or more incremental backups. A full backup may entail generating a copy (i.e., snapshot) of all state, configurations, and/or metadata associated with a given target database at a point-in-time, whereas an incremental backup may alternatively entail generating a copy (i.e., snapshot) of merely changes to the state, configurations, and/or metadata associated with the given target database that may have incurred since the last (or previous) database backup operation. Furthermore, the input(s) of this backup operation stage, which may be used in performing the aforementioned process(es), may at least include the above-outlined output(s) of the Stage 0 (S0) and Stage 1 (S1) backup operation stages of the given database backup operation. Moreover, the output(s) of this backup operation stage, which may be yielded from performing the aforementioned process(es), may include, but is/are not limited to: one or more sets of target database backup metadata (i.e., target database backup history/chain) associated with one or more target databases, respectively.

In one embodiment of the invention, the Stage 3 (S3) (208) backup operation stage of any given database backup operation may be directed to target properties validation. In this backup operation stage, the process(es) that may be performed may include, but is/are not limited to: determining whether the given data backup operation may proceed for a given target database; and, more specifically, determining whether a given target database is invalid, inconsistent, or excluded. An invalid target database may refer to a target database to which a connection or access is unable to be established. An inconsistent target database may refer to a target database that includes changes to a transaction log that do not agree with information maintained in a configuration file for the target database. An excluded target database may refer to a target database that may be blacklisted from database backup operations based on user-defined policies. Furthermore, the input(s) of this backup operation stage, which may be used in performing the aforementioned process(es), may at least include the above-outlined output(s) of the Stage 0 (S0) and Stage 2 (S2) backup operation stages of the given database backup operation. Moreover, the output(s) of this backup operation stage, which may be yielded from performing the aforementioned process(es), may include, but is/are not limited to: one or more target database IDs and/or one or more target database locations associated with one or more valid, consistent, or included target databases, respectively.

In one embodiment of the invention, the Stage 4 (S4) (210) backup operation stage of any given database backup operation may be directed to target snapshot generation. In this backup operation stage, the process(es) that may be performed may include, but is/are not limited to: generating a snapshot of each valid, consistent, or included target database to which the given database backup operation is directed. A snapshot may represent a point-in-time, full or incremental, exact copy of any granularity (e.g., one or more volumes) of state, configuration, and/or metadata pertaining to a given target database. Furthermore, the input(s) of this backup operation stage, which may be used in performing the aforementioned process(es), may at least include the above-outlined output(s) of the Stage 3 (S3) backup operation stage of the given database backup operation. Moreover, the output(s) of this backup operation stage, which may be yielded from performing the aforementioned process(es), may include, but is/are not limited to: one or more target database snapshots of one or more valid, consistent, or included target databases, respectively.

In one embodiment of the invention, the Stage 5 (S5) (212) backup operation stage of any given database backup operation may be directed to target snapshot rollover. In this backup operation stage, the process(es) that may be performed may include, but is/are not limited to: distributing data rollover ownership (described below) (see e.g., FIG. 3); and transferring one or more target database snapshots to the remote backup storage (RBS) (see e.g., FIG. 1A) for consolidation. Furthermore, the input(s) of this backup operation stage, which may be used in performing the aforementioned process(es), may at least include the above-outlined output(s) of the Stage 3 (S3) and Stage 4 (S4) backup operation stages of the given database backup operation, and the global load distribution table (GLDT) (see e.g., FIG. 3) maintained across the various client nodes. Moreover, the output(s) of this backup operation stage, which may be yielded from performing the aforementioned process(es), may include, but is/are not limited to: one or more rollover completion statuses indicating states of snapshot transfer completion for one or more valid, consistent, or included target databases, respectively.

In one embodiment of the invention, the Stage 6 (S6) (214) backup operation stage of any given database backup operation may be directed to post-snapshot cleanup. In this backup operation stage, the process(es) that may be performed may include, but is/are not limited to: removing temp files created throughout the given database backup operation; freeing memory allocated to support the previous backup operation stages of the given database backup operation; and removing un-needed data and/or metadata associated with one or more invalid, inconsistent, or excluded target databases. Furthermore, the input(s) of this backup operation stage, which may be used in performing the aforementioned process(es), may at least include the above-outlined output(s) of the Stage 3 (S3) and Stage 5 (S5) backup operation stages of the given database backup operation. Moreover, the output(s) of this backup operation stage, which may be yielded from performing the aforementioned process(es), may include, but is/are not limited to: one or more cleanup completion statuses indicating states of housekeeping task completion for one or more valid, consistent, or included target databases, respectively.

In one embodiment of the invention, the Stage 7 (S7) (216) backup operation stage of any given database backup operation may be directed to backup commitment. In this backup operation stage, the process(es) that may be performed may include, but is/are not limited to: committing the snapshot for each valid, consistent, or included target database to which the given database backup operation is directed; and updating post-backup pertinent metadata (e.g., updating the target database backup history or chain (described above)) to reflect the recently executed given database backup operation directed to each valid, consistent, or included target database. Furthermore, the input(s) of this backup operation stage, which may be used in performing the aforementioned process(es), may at least include the above-outlined output(s) of the Stage 3 (S3) and Stage 6 (S6) backup operations stages of the given database backup operation. Moreover, the output(s) of this backup operation stage, which may be yielded from performing the aforementioned process(es), may include, but is/are not limited to: one or more commitment completion statuses indicating states of database backup completion for one or more valid, consistent, or included target databases, respectively.

Figure 3:
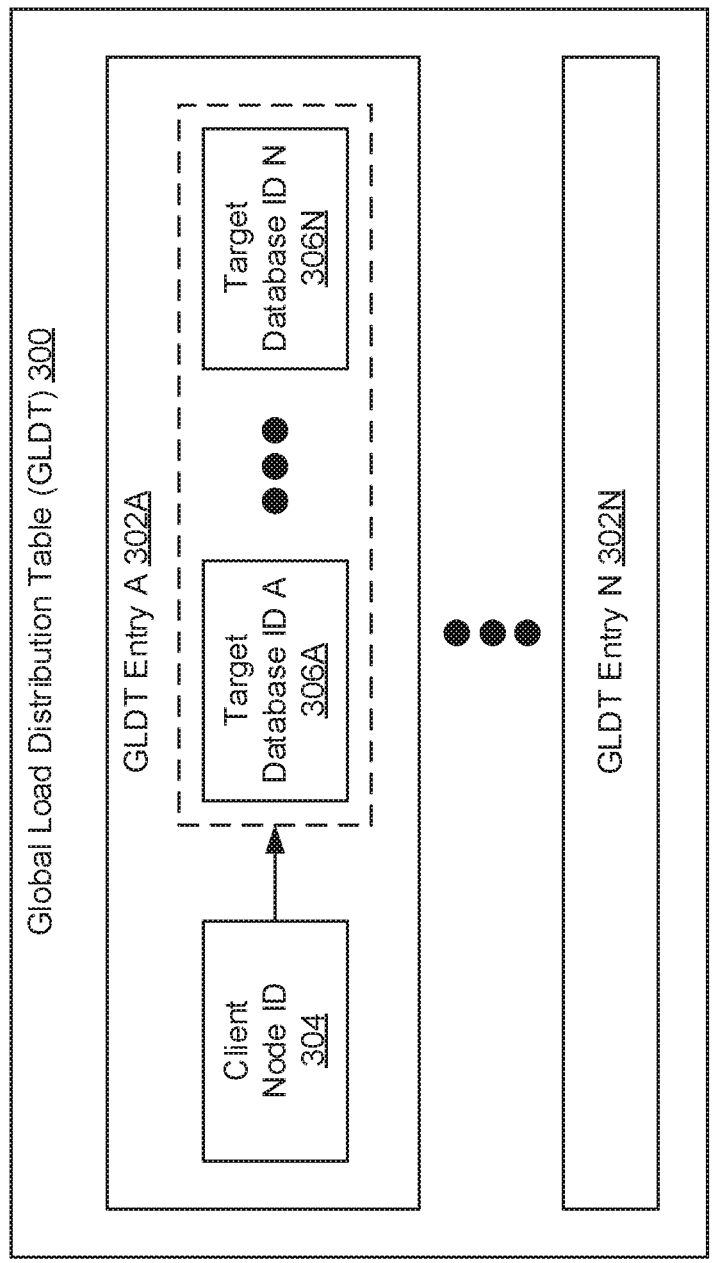
FIG. 3 shows a global load distribution table in accordance with one or more embodiments of the invention.

FIG. 3 shows a global load distribution table (GLDT) in accordance with one or more embodiments of the invention. The GLDT (300) may represent a data object or structure for storing and tracking data rollover ownership mappings. A data rollover ownership mapping may track the snapshots (described above), pertaining to one or more target databases, queued to be transferred to or consolidated in the remote backup storage (RBS) (see e.g., FIG. 1A) by a given client node. Further, the GLDT (300) may be shared and/or maintained across the various load balancing services (LBSs) (see e.g., FIG. 1B) executing on the various client nodes of the load balancing cluster.

In one embodiment of the invention, these aforementioned data rollover ownership mappings may be stored and tracked through one or more GLDT entries (302A-302N). Each GLDT entry (302A-302N) may store and track a data rollover ownership mapping for a different client node of the load balancing cluster. Accordingly, any given GDLT entry (302A-302N) may include a client node identifier (ID) (304) assigned to a given client node, and zero or more target database IDs (306A-306N) associated with zero or more target databases, respectively. In one embodiment of the invention, the client node ID (304) may refer to a string of characters (e.g., letters, numbers, symbols, etc.) that may uniquely identify the given client node, whereas a target database ID (306A-306N) may refer to a string of characters (e.g., letters, numbers, symbols, etc.) that may uniquely identify a given target database. Further, the client node ID (304) and the target database ID(s) (306A-306N) may each extend any length and may entail any combination of characters. By way of examples, the client node ID (304) and the target database ID(s) (306A-306N) may each be represented through an alphanumeric string, or through a N-bit integer (where N>0) expressed in hexadecimal notation.

In one embodiment of the invention, the one or more data rollover ownership mappings stored and tracked in the GLDT (300) may be initialized based on a static load distribution algorithm governed by user preferences, and an equitable load distribution of various workloads instantiated and/or executing at the moment of GLDT (300) initialization. GLDT (300) initialization may transpire during or after the performance of the Stage 5 (S5) (described above) backup operation stage for any given database backup operation. Further, the one or more data rollover ownership mappings stored and tracked in the GLDT (300) may be updated based, at least in part, on the availability of client nodes directed to alleviating snapshot rollover (i.e., snapshot transfer) congestion. That is, one or more data rollover ownership mappings may change to remove or add one or more target database IDs (306A-306N) based on the re-assignment of data rollover ownership from congested or occupied client nodes to available or idle client nodes.

Figure 4:
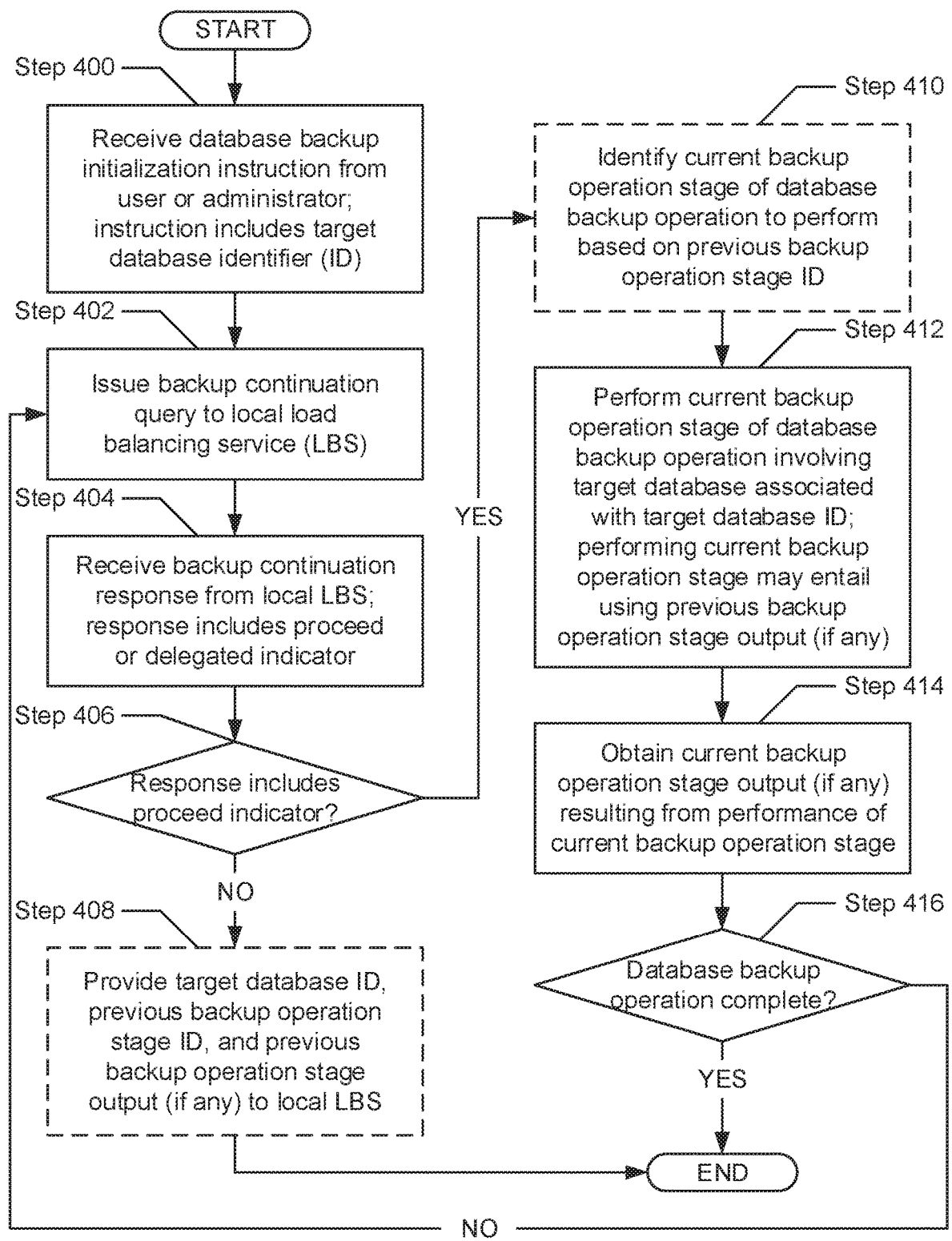
FIG. 4 shows a flowchart describing a method for processing a database backup initialization instruction in accordance with one or more embodiments of the invention.

FIG. 4 shows a flowchart describing a method for processing a database backup initialization instruction in accordance with one or more embodiments of the invention. The various steps outlined below may be performed by the data backup agent (DBA) residing on any client node (see e.g., FIG. 1B). Further, while the various steps in the flowchart are presented and described sequentially, one of ordinary skill will appreciate that some or all steps may be executed in different orders, may be combined or omitted, and some or all steps may be executed in parallel.

Turning to FIG. 4, in Step 400, a database backup initialization instruction is received. In one embodiment of the invention, the database backup initialization instruction may be received from a user accessing a client node or, alternatively, from a computing system (see e.g., FIG. 10) operated by an administrator of the system shown in FIG. 1A. Further, the database backup initialization instruction may pertain to the instantiation of a database backup operation directed to a target database. Accordingly, the database backup initialization instruction may include a target database identifier (ID) associated with the aforementioned target database.

In Step 402, in response to the database backup initialization instruction (received in Step 400), a backup continuation query is issued to a local load balancing service (LBS) (see e.g., FIG. 1B). In one embodiment of the invention, the local LBS may represent the LBS that may be executing on the same client node on which the DBA, which may be performing the method disclosed in FIG. 4, may also be executing. Further, the backup continuation query may be a request for permission to proceed in performing a backup operation stage (see e.g., FIG. 2) of the database backup operation directed to the target database, which may have been instantiated through the received database backup initialization instruction.

In Step 404, a backup continuation response is received from the local LBS. In one embodiment of the invention, the backup continuation response may represent a reply to the backup continuation query (issued in Step 402). Further, the backup continuation response may include either a proceed or a delegated indicator. The proceed indicator may be implemented as a notification or an instruction that directs the DBA (performing the method disclosed in FIG. 4) to proceed in the execution of a current backup operation stage of the database backup operation directed to the target database. The delegated indicator, on the other hand, may be implemented as a notification or an instruction that directs the DBA to stand down and, subsequently, not pursue the execution of a current backup operation stage of the database backup operation directed to the target database.

In Step 406, a determination is made as to whether the backup continuation response (received in Step 404) includes a proceed indicator (described above). In one embodiment of the invention, if it is determined that the backup continuation response includes the proceed indicator, then the process may proceed to Step 410. On the other hand, in another embodiment of the invention, if it is alternatively determined that the backup continuation includes a delegated indicator instead (described above), then the process may alternatively proceed to Step 408.

In Step 408, after determining (in Step 406) that the backup continuation response (received in Step 404) includes the delegated indicator, certain information is subsequently provided to the local LBS. Specifically, in one embodiment of the invention, the provided information may include, but is not limited to: (a) the target database ID associated with the target database; (b) a backup operation stage ID associated with a previous backup operation stage (if any) of the database backup operation directed to the target database; and (c) a backup operation stage output associated with the previous backup operation stage (if any) of the database backup operation directed to the target database.

In Step 410, after determining (in Step 406) that the backup continuation response (received in Step 404) includes the proceed indicator, a current backup operation stage, of the database backup operation directed to the target database, is identified. In one embodiment of the invention, based on the database backup initialization instruction (received in Step 400), the current backup operation stage to perform may be a first backup operation stage—i.e., Stage 1 (S1) (see e.g., FIG. 2). In another embodiment of the invention, the current backup operation stage to perform may alternatively be identified based on a receipt of a backup operation stage ID associated with a previous backup operation stage. In this latter embodiment, the previous backup operation stage may have been executed by the DBA, which may be performing the method shown in FIG. 4 (i.e., the local DBA), or by a remote DBA residing on a remote client node. Accordingly, the aforementioned backup operation stage ID, associated with the previous backup operation stage, may have already been known to the local DBA, or may have been provided to the local DBA from a remote client node via the local LBS.

In Step 412, the current backup operation stage (identified in Step 410), of the database backup operation directed to the target database, is subsequently performed. In one embodiment of the invention, performing the current backup operation stage may entail executing the one or more tasks, associated with the relevant backup operation stage, detailed above with respect to FIG. 2. For example, if Stage 4 (S4)—i.e., target snapshot generation—is identified as the current backup operation stage to perform, then the one or more tasks outlined above with respect to Stage 4 (S4) may subsequently be performed. Furthermore, performing the current backup operation stage may further entail using a backup operation stage output (if any) associated with a previous backup operation stage, which is also further described above with respect to FIG. 2. That is, following the aforementioned example, performing Stage 4 (S4), identified as the current backup operation stage for this non-limiting example, may entail using the output yielded from the execution of the previous backup operation stage—i.e., Stage 3 (S3). This previous backup operation stage output may be readily available if the local DBA had performed the previous backup operation stage, or may be provided from a remote client node if a remote DBA had alternatively performed the previous backup operation stage.

In Step 414, a current backup operation stage output (if any) is obtained. In one embodiment of the invention, the current backup operation stage output may represent the output yielded from executing the current backup operation stage (performed in Step 412). Further, the current backup operation stage output may include the output(s), associated with the relevant backup operation stage, detailed above with respect to FIG. 2.

In Step 416, a determination is made as to whether the database backup operation, directed to the target database, is complete. Completion of the database backup operation may occur when the current backup operation stage (identified in Step 410) is the last backup operation stage—i.e., Stage 7 (S7)—backup commitment. Subsequently, in one embodiment of the invention, if it is determined that the current backup operation stage is the last backup operation stage, thereby indicating that the database backup operation is complete, then the process ends. On the other hand, in another embodiment of the invention, if it is alternatively determined that the current backup operation stage is not the last backup operation stage, thereby indicating that the database backup operation is incomplete, then the process may alternatively proceed to Step 402. At Step 402, another backup continuation query may be issued to the local LBS, which may pertain to requesting permission to proceed in performing a next backup operation stage of the database backup operation directed to the target database.

Figure 5:
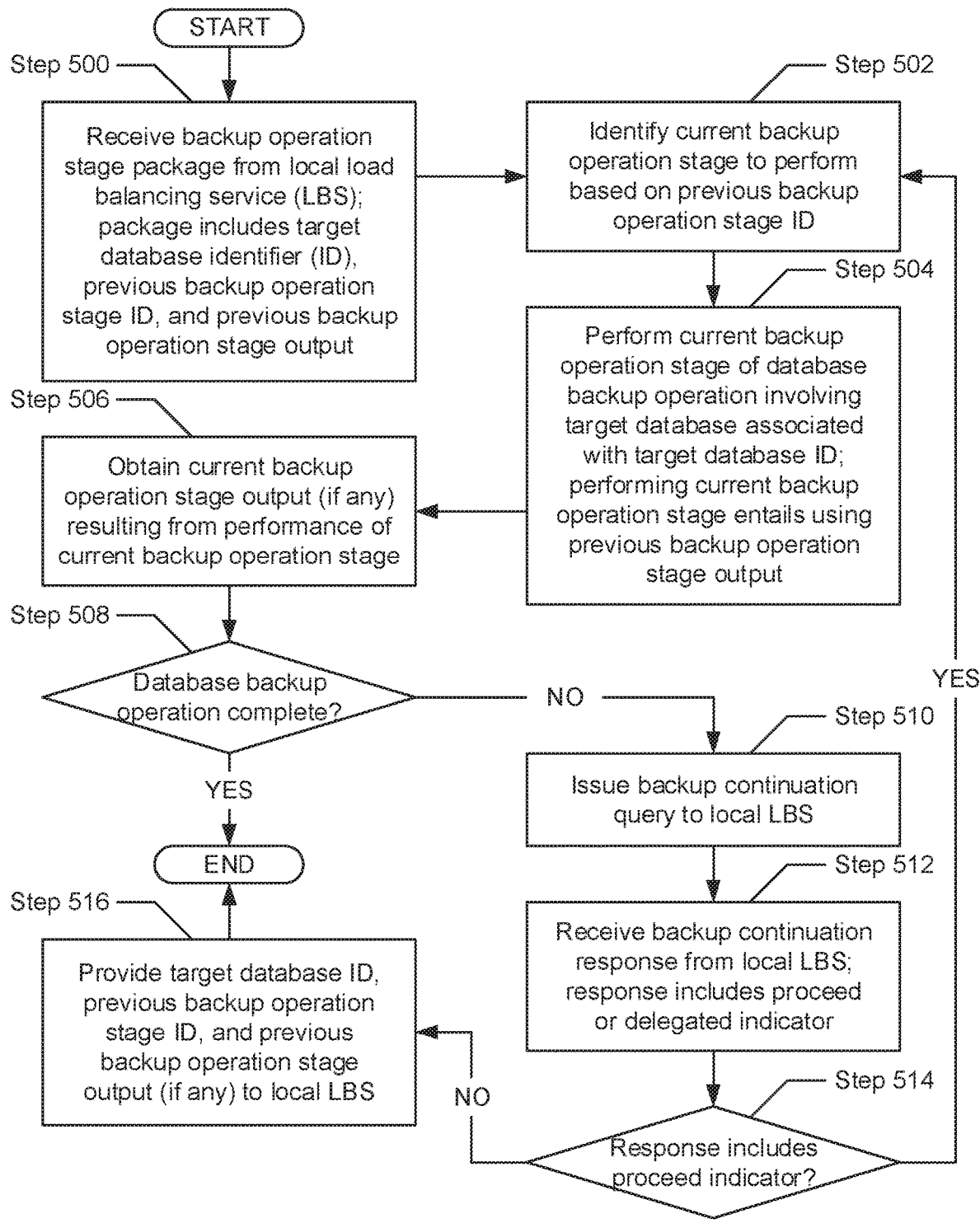
FIG. 5 shows a flowchart describing a method for processing a backup operation stage package in accordance with one or more embodiments of the invention.

FIG. 5 shows a flowchart describing a method for processing a backup operation stage package in accordance with one or more embodiments of the invention. The various steps outlined below may be performed by the data backup agent (DBA) residing on any client node (see e.g., FIG. 1B). Further, while the various steps in the flowchart are presented and described sequentially, one of ordinary skill will appreciate that some or all steps may be executed in different orders, may be combined or omitted, and some or all steps may be executed in parallel.

Turning to FIG. 5, in Step 500, a backup operation stage package is received. In one embodiment of the invention, the backup operation stage package may have been received from a local load balancing service (LBS)—i.e., the LBS executing on the same client node on which the DBA (i.e., a local DBA), performing the method described in FIG. 5, may also be executing. Further, the backup operation stage package may include, but is not limited to: (a) a target database identifier (ID) associated with a target database to which a database backup operation is directed; (b) a previous backup operation stage ID associated with a previously performed backup operation stage (if any); and (c) a previous backup operation stage output (if any) yielded from the previously performed backup operation stage. Moreover, the backup operation stage package, though provided by the local LBS, may have originated from a remote client node, where a remote DBA thereon may have executed the aforementioned previously performed backup operation stage (if any) at the remote client node.

In Step 502, a current backup operation stage to perform is identified. In one embodiment of the invention, the current backup operation stage to perform may be identified based on the previous backup operation stage ID (obtained via the backup operation stage package received in Step 500). By way of an example, assume a previous backup operation stage ID pertains to Stage 1 (S1)—i.e., target data collection—of the database backup operation. Following the sequence of backup operation stages described above with respect to FIG. 2, the current backup operation stage to perform may represent the subsequent backup operation stage in the sequence, or Stage 2 (S2)—i.e., target backup history validation.

In Step 504, the current backup operation stage (identified in Step 502), of the database backup operation directed to the target database, is subsequently performed. In one embodiment of the invention, performing the current backup operation stage may entail executing the one or more tasks, associated with the relevant backup operation stage, detailed above with respect to FIG. 2. That is, following the above example, if Stage 2 (S2)—i.e., target backup history validation—is identified as the current backup operation stage to perform, then the one or more tasks outlined above with respect to Stage 2 (S2) may subsequently be performed. Furthermore, performing the current backup operation stage may further entail using the previous backup operation stage output (if any) (obtained via the backup operation stage package received in Step 500).

In Step 506, a current backup operation stage output (if any) is obtained. In one embodiment of the invention, the current backup operation stage output may represent the output yielded from executing the current backup operation stage (performed in Step 504). Further, the current backup operation stage output may include the output(s), associated with the relevant backup operation stage, detailed above with respect to FIG. 2. That is, following the above example, if Stage 2 (S2)—i.e., target backup history validation—is identified as the current backup operation stage to perform, then the one or more outputs outlined above with respect to Stage 2 (S2) may subsequently be obtained.

In Step 508, a determination is made as to whether the database backup operation, directed to the target database, is complete. Completion of the database backup operation may occur when the current backup operation stage (identified in Step 502) is the last backup operation stage—i.e., Stage 7 (S7)—backup commitment. Subsequently, in one embodiment of the invention, if it is determined that the current backup operation stage is the last backup operation stage, thereby indicating that the database backup operation is complete, then the process ends. On the other hand, in another embodiment of the invention, if it is alternatively determined that the current backup operation stage is not the last backup operation stage, thereby indicating that the database backup operation is incomplete, then the process may alternatively proceed to Step 510.

In Step 510, after determining (in Step 508) that the database backup operation, directed to the target database, is incomplete, a backup continuation query is issued to the local LBS. In one embodiment of the invention, the backup continuation query may be a request for permission to proceed in performing a next backup operation stage (i.e., a backup operation stage subsequent to the current backup operation stage (identified in Step 502) in the sequence of backup operations stages (see e.g., FIG. 2)) of the database backup operation directed to the target database.

In Step 512, a backup continuation response is received from the local LBS. In one embodiment of the invention, the backup continuation response may represent a reply to the backup continuation query (issued in Step 510). Further, the backup continuation response may include either a proceed or a delegated indicator. The proceed indicator may be implemented as a notification or an instruction that directs the local DBA (performing the method disclosed in FIG. 5) to proceed in the execution of a next backup operation stage of the database backup operation directed to the target database. The delegated indicator, on the other hand, may be implemented as a notification or an instruction that directs the local DBA to stand down and, subsequently, not pursue the execution of a next backup operation stage of the database backup operation directed to the target database.

In Step 514, a determination is made as to whether the backup continuation response (received in Step 512) includes a proceed indicator (described above). In one embodiment of the invention, if it is determined that the backup continuation response includes the proceed indicator, then the process may proceed to Step 502, where the next backup operation stage, of the database backup operation directed to the target database, may be identified. On the other hand, in another embodiment of the invention, if it is alternatively determined that the backup continuation includes a delegated indicator instead (described above), then the process may alternatively proceed to Step 516.

In Step 516, after determining (in Step 514) that the backup continuation response (received in Step 512) includes the delegated indicator, certain information is subsequently provided to the local LBS. Specifically, in one embodiment of the invention, the provided information may include, but is not limited to: (a) the target database ID associated with the target database; (b) a backup operation stage ID associated with the recently performed current backup operation stage of the database backup operation directed to the target database; and (c) the current backup operation stage output (obtained in Step 506) yielded from executing the current backup operation stage (performed in Step 504).

Figure 6:
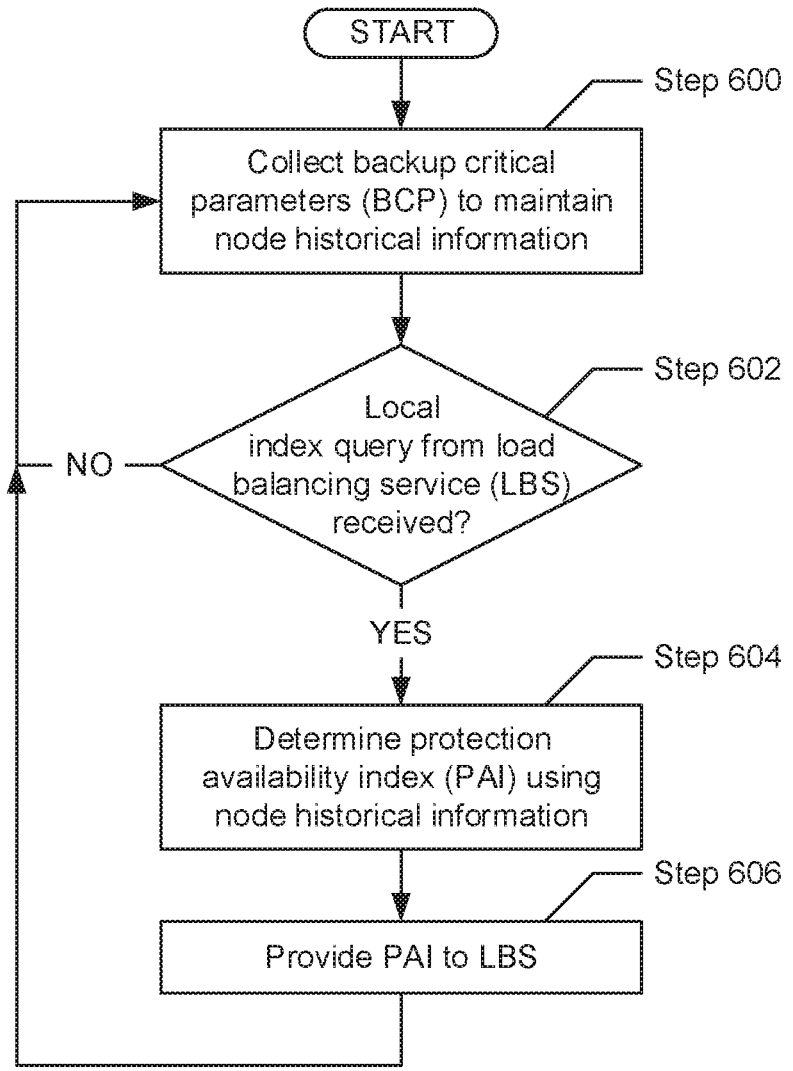
FIG. 6 shows a flowchart describing a method for determining a protection availability index in accordance with one or more embodiments of the invention.

FIG. 6 shows a flowchart describing a method for determining a protection availability index in accordance with one or more embodiments of the invention. The various steps outlined below may be performed by the process monitoring service (PMS) residing on any client node (see e.g., FIG. 1B). Further, while the various steps in the flowchart are presented and described sequentially, one of ordinary skill will appreciate that some or all steps may be executed in different orders, may be combined or omitted, and some or all steps may be executed in parallel.

Turning to FIG. 6, in Step 600, one or more backup critical parameters (BCPs) is/are collected. In one embodiment of the invention, each BCP may refer to a factor (i.e., exhibited, employed, generated, or otherwise associated with a local client node) which may, at least in part, affect any data backup and/or recovery operations that may be performed on the local client node. The local client node may be the client node on which the PMS, which may be performing the method disclosed in FIG. 6, may be executing. Further, the BCP(s) may be collected periodically over any span of time in order to maintain node historical information for the local client node. Node historical information may thus serve to capture a historical profile of various data backup and/or recovery pertinent points of data. Moreover, examples of BCPs include, but are not limited to, node compute resources, node network resources, node storage resources, node virtualization resources, and node configuration information.

In one embodiment of the invention, a node compute resource may refer to a measurable quantity of a compute-relevant resource type that can be requested, allocated, and consumed. A compute-relevant resource type may pertain to a physical device (i.e., hardware), a logical intelligence (i.e., software), or a combination thereof, which implements some computing functionality of the local client node. By way of examples, a compute-relevant resource type component of the local client node may include, but is not limited to, a central processing unit (CPU) and a graphical processing unit (GPU). Further, examples of node compute resources (or factors) that may affect data backup and/or recovery operations on the local client node may include, but are not limited to, compute utilization percentage, compute wait time, compute contention percentage, compute overhead, etc.

In one embodiment of the invention, a node network resource may refer to a measurable quantity of a network-relevant resource type that can be requested, allocated, and consumed. A network-relevant resource type may pertain to a physical device (i.e., hardware), a logical intelligence (i.e., software), or a combination thereof, which implements some networking functionality of the local client node. By way of examples, a network-relevant resource type component of the local client node may include, but is not limited to, a network interface card (NIC) and a network adapter. Further, examples of node network resources (or factors) that may affect data backup and/or recovery operations on the local client node may include, but are not limited to, network bandwidth, network latency, data transfer network throughput, network jitter, data receive rate, data transmit rate, dropped packets percentage, etc.

In one embodiment of the invention, a node storage resource may refer to a measurable quantity of a storage-relevant resource type that can be requested, allocated, and consumed. A storage-relevant resource type may pertain to a physical device (i.e., hardware), a logical intelligence (i.e., software), or a combination thereof, which implements some storage functionality of the local client node. By way of examples, a storage-relevant resource type component of the local client node may include, but is not limited to, volatile memory (e.g., random access memory (RAM)) and persistent storage (e.g., flash memory, hard disk drives (HDD), solid state drives (SSDs), etc.). Further, examples of node storage resources (or factors) that may affect data backup and/or recovery operations on the local client node may include, but are not limited to, memory utilization percentage, disk input-output (IO) latency, disk IO throughput, disk access or response time, memory compression rate, memory contention percentage, heap allocation percentage, etc.

In one embodiment of the invention, a node virtualization resource may refer to a measurable quantity of a virtualization-relevant resource type that can be requested, allocated, and consumed. A virtualization-relevant resource type may pertain to a physical device (i.e., hardware), a logical intelligence (i.e., software), or a combination thereof, which implements some virtualization functionality of the local client node. By way of examples, a virtualization-relevant resource type component of the local client node may include, but is not limited to, a virtual machine and a container. Further, examples of node virtualization resources (or factors) that may affect data backup and/or recovery operations on the local client node may include, but is not limited to, a number of running virtual machines, virtual machine disk input-output (IO) latency, virtual machine input-output operations per second (TOPS), a number of virtual CPUs (vCPUs) on powered-on virtual machines, etc.

In one embodiment of the invention, node configuration information may refer to metadata describing an arrangement of hardware, software, and/or firmware components, which may be installed and therefore constitute the local client node. A hardware component may represent any physical or tangible component of the local client node—e.g., motherboards, CPUs, GPUs, RAM, power supplies, video cards, storage devices, audio cards, NICs, input peripherals, output peripherals, etc. A software component may represent any logical package implemented through computer instructions, or computer readable program code, which may be executed by one or more hardware components—e.g., operating systems (OSs), applications, utilities, tools, etc. A firmware component may represent any embedded logical package implemented through specialized computer instructions, which govern the basic functionalities of one or more hardware components—e.g., device drivers, basic input-output systems (BIOSs), virtual device drivers, etc. Furthermore, examples of metadata (or factors) that may affect data backup and/or recovery operations on the local client node may include, but is not limited to, version number, model number, device category, manufacturer name, etc.

In Step 602, a determination is made as to whether a local index query has been received from a local load balancing service (LBS). A local LBS may represent the LBS that may be executing on the same client node (i.e., the local client node) on which the PMS, which may be performing the method disclosed in FIG. 6, may also be executing. Further, the local index query may pertain to obtaining a protection availability index (PAI) (described below) for the local client node. Subsequently, in one embodiment of the invention, if it is determined that a local index query has been received, then the process may proceed to Step 604. On the other hand, in another embodiment of the invention, if it is alternatively determined that a local index query has not been received, then the process may proceed to Step 600, where the BCP(s) is/are continued to be collected in order to maintain node historical information for the local client node.

In Step 604, after determining (in Step 602) that a local index query has been received from the local LBS, a current PAI for the local client node is determined. In one embodiment of the invention, the current PAI for the local client node may represent a measure (e.g., a numerical value) that quantifies a current availability of resources (e.g., compute, memory, storage, network, virtualization, etc.), existing on the local client node, that may be allocated towards performing a backup operation stage (see e.g., FIG. 2) of a database backup operation directed to a target database. Further, determining the current PAI for the local client node may entail using the node historical information (maintained through the collection of BCPs in Step 600), any combination of which may be employed as input data to be processed by a deep learning model (DLM) (described below).

In one embodiment of the invention, a DLM may be a machine learning and/or artificial intelligence paradigm (e.g., a neural network, a decision tree, a support vector machine, etc.). Any DLM may be defined through a set of parameters and/or hyper-parameters that may be optimized or tuned to assure the optimal performance of a function— e.g., the mapping of node historical information to a current PAI for the local client node. A parameter may refer to a configuration variable that is internal to the DLM and whose value may be estimated from data. Examples of a parameter include, but are not limited to, the weights in a neural network, and the support vectors in a support vector machine. In contrast, a hyper-parameter may refer to a configuration variable that is external to the DLM and whose value may not be estimated from data. Examples of a hyper-parameter include, but are not limited to, the learning rate for training a neural network, and the soft margin cost function for a nonlinear support vector machine. Further, any DLM may be further defined through other architectural elements, which may vary depending on the paradigm based on which the DLM may be modeled.

For example, if a DLM follows a neural network design, other architectural elements that may be considered may include, but are not limited to: a number of layers, a number of nodes occupying each layer, an interconnectivity configuration between the various nodes, values for weights representative of the strengths of the various inter-nodal connections, propagation functions through which nodal outputs are computed with respect to nodal inputs and/or other parameters (e.g., weights), a specificity of a learning rule governing how the one or more parameters are adjusted to produce desired training results, etc. By way of another example, if a DLM follows a support vector machine design, other architectural elements that may be considered may alternatively include, but are not limited to: a number of support vectors defining hyperplane(s) that maximize the margins between classes, a kernel function for translating low dimensional input data into a higher dimensional space, a penalty value associated with an error term, a specificity of a kernel coefficient used for best-fitting the training data, etc.

In one embodiment of the invention, a DLM may be optimized through supervised learning. Supervised learning may refer to learning (or optimization) through the analyses of training examples and/or data. Substantively, through supervised learning, the various architectural elements (e.g., parameters, hyper-parameters, etc.) of a DLM may be adjusted through the successive feeding of training or sample node historical information. After each training or sample node historical information is fed into the DLM, which may be defined by various architectural elements set to specific values, an output (e.g., a current PAI) may be obtained. The obtained output may subsequently be compared to a desired output for the training or sample node historical information that had been fed into the DLM for processing. Thereafter, the values associated with the various architectural elements are adjusted based on the comparison between the obtained output and the desired output in view of a specified optimization goal (e.g., the minimization of errors between the obtained output and the desired output) being met.

Further, in one embodiment of the invention, as each successive training or sample node historical information is processed, the adjusted values of the various architectural elements may be carried over into the processing of the subsequent training or sample node historical information, where the various architectural elements may be further adjusted until the specified optimization goal for the subsequent training or sample node historical information is also met. In one embodiment of the invention, the training/sample node historical information and corresponding desired outputs may be generated from any combination of BCPs collected over any span of time. One of ordinary skill will appreciate that other learning methodologies (e.g., unsupervised learning) may be used to optimize a DLM without departing from the scope of the invention. Substantively, in one embodiment of the invention, a DLM may include functionality to: receive input data (i.e., node historical information); process the input data using an optimized set of architectural element values; and produce output data (i.e., a current PAI) based on the processing.

In Step 606, the current PAI (determined in Step 604) is subsequently provided to the local LBS. Specifically, in one embodiment of the invention, the current PAI may be provided via a local inquiry response, which may represent a reply to the local index query (determined to have been received in Step 602). Thereafter, the process may proceed to Step 600, where the BCP(s) is/are continued to be collected in order to maintain node historical information for the local client node.

Figure 7:
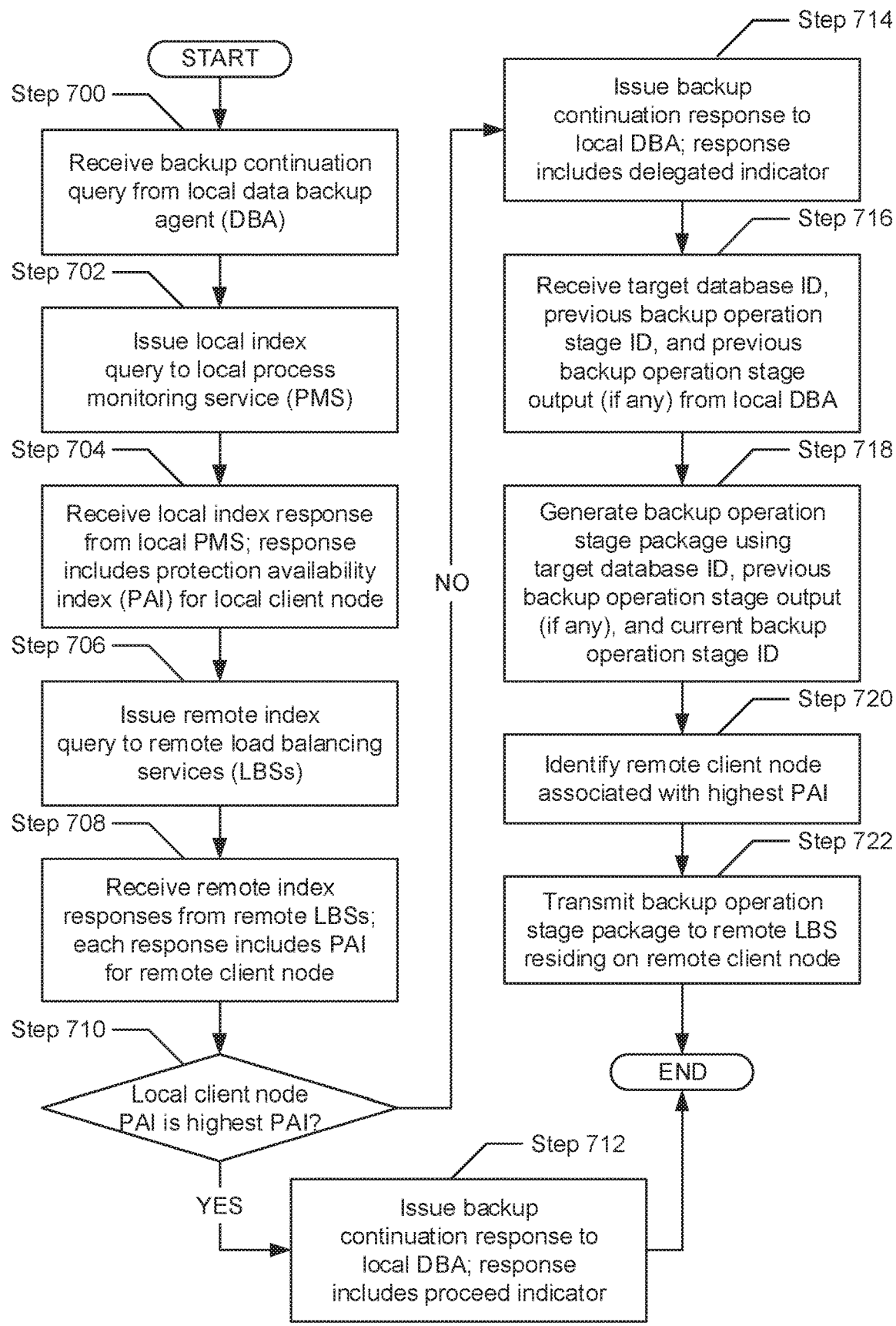
FIG. 7 shows a flowchart describing a method for processing a backup continuation query in accordance with one or more embodiments of the invention.

FIG. 7 shows a flowchart describing a method for processing a backup continuation query in accordance with one or more embodiments of the invention. The various steps outlined below may be performed by the load balancing service (LBS) residing on any client node (see e.g., FIG. 1B). Further, while the various steps in the flowchart are presented and described sequentially, one of ordinary skill will appreciate that some or all steps may be executed in different orders, may be combined or omitted, and some or all steps may be executed in parallel.

Turning to FIG. 7, in Step 700, a backup continuation query is received. Specifically, in one embodiment of the invention, the backup continuation query may be received from a local data backup agent (DBA). The local DBA may represent the DBA that may be executing on the same client node on which the LBS (i.e., local LBS), which may be performing the method disclosed in FIG. 7, may also be executing. Further, the backup continuation query may be a request for permission, by the local DBA, to proceed in performing a backup operation stage (see e.g., FIG. 2) of a database backup operation directed to a target database.

In Step 702, in response to the backup continuation query (received in Step 700), a local index query is subsequently issued to a local process monitoring service (PMS). In one embodiment of the invention, the local PMS may represent the PMS that may be executing on the same client node on which the local LBS (which may be performing the method disclosed in FIG. 7) may also be executing. Further, the local index query may pertain to obtaining a protection availability index (PAI) (described below) for the local client node, where the local client node is the client node on which the local DBA, the local LBS, and the local PMS may all be executing.

In Step 704, a local index response is received from the local PMS. In one embodiment of the invention, the local index response may represent a reply to the local index query (issued in Step 702). Further, the local index response may include the current PAI for the local client node. The current PAI for the local client node may represent a measure that quantifies a current availability of resources (e.g., compute, memory, storage, network bandwidth, etc.), existing on the local client node, that may be allocated towards performing a backup operation stage (see e.g., FIG. 2) of the database backup operation directed to the target database.

In Step 706, one or more remote index queries is/are issued to one or more remote LBSs, respectively. In one embodiment of the invention, a remote LBS may represent a LBS that may be executing on a different client node than the client node on which the local LBS (which may be performing the method disclosed in FIG. 7) may be executing. Further, each remote index query may pertain to obtaining a PAI respective to a remote client node.

In Step 708, one or more remote index responses is/are received from the one or more remote LBSs, respectively. In one embodiment of the invention, each remote index response may represent a reply to a corresponding remote index query (issued in Step 706). Further, each remote index response may include a current PAI for a different remote client node. The current PAI for a remote client node may represent a measure that quantifies a current availability of resources (e.g., compute, memory, storage, network bandwidth, etc.), existing on the remote client node, that may be allocated towards performing a backup operation stage (see e.g., FIG. 2) of the database backup operation directed to the target database.

In Step 710, a determination is made as to whether the current PAI for the local client node (obtained via the local index response received in Step 704) exceeds one or more current PAIs for one or more remote client nodes, respectively (obtained via the one or more remote index responses received in Step 708). In one embodiment of the invention, if it is determined that the current PAI for the local client node does exceed each and every current PAI for the remote client node(s), then the process may proceed to Step 712. On the other hand, in another embodiment of the invention, if it is alternatively determined that the current PAI for the local client node does not exceed at least one current PAI for the remote client node(s), then the process may alternatively proceed to Step 714.

In Step 712, after determining (in Step 710) that the current PAI for the local client node exceeds each and every current PAI for the remote client node(s), a backup continuation response is issued to the local DBA. In one embodiment of the invention, the backup continuation response may represent a reply to the backup continuation query (received in Step 700). Further, the backup continuation response may include a proceed indicator. The proceed indicator may be implemented as a notification or an instruction that directs the local DBA to proceed in the execution of a backup operation stage (for which permission was sought) of the database backup operation directed to the target database.

In Step 714, after alternatively determining (in Step 710) that the current PAI for the local client node does not exceed at least one current PAI for the remote client node(s), a backup continuation response is issued to the local DBA. In one embodiment of the invention, the backup continuation response may represent a reply to the backup continuation query (received in Step 700). Further, the backup continuation response may include a delegated indicator. The delegated indicator may be implemented as a notification or an instruction that directs the local DBA to stand down and, subsequently, not pursue the execution of a backup operation stage (for which permission was sought) of the database backup operation directed to the target database.

In Step 716, in response to the backup continuation response (issued in Step 714), certain information is received back from the local DBA. Specifically, in one embodiment of the invention, the received information may include, but is not limited to: (a) the target database ID associated with the target database; (b) a backup operation stage ID associated with a previous backup operation stage (if any) of the database backup operation directed to the target database; and (c) a backup operation stage output associated with the previous backup operation stage (if any) of the database backup operation directed to the target database.

In Step 718, a backup operation stage package is generated. Specifically, in one embodiment of the invention, the backup operation stage package may be generated using at least the target database ID, the previous backup operation stage ID, and the previous backup operation stage output (if any) (received from the local DBA in Step 716). After, in Step 720, a remote client node associated with the highest or greatest current PAI is identified. In one embodiment of the invention, the highest/greatest current PAI may have been one of the current PAI(s) for the remote client node(s), respectively (obtained via the one or more remote index responses received in Step 708). Thereafter, in Step 722, the backup operation stage package (generated in Step 718) is subsequently transmitted to a remote LBS, where the remote LBS may be executing on the remote client node (identified in Step 720).

Figure 8:
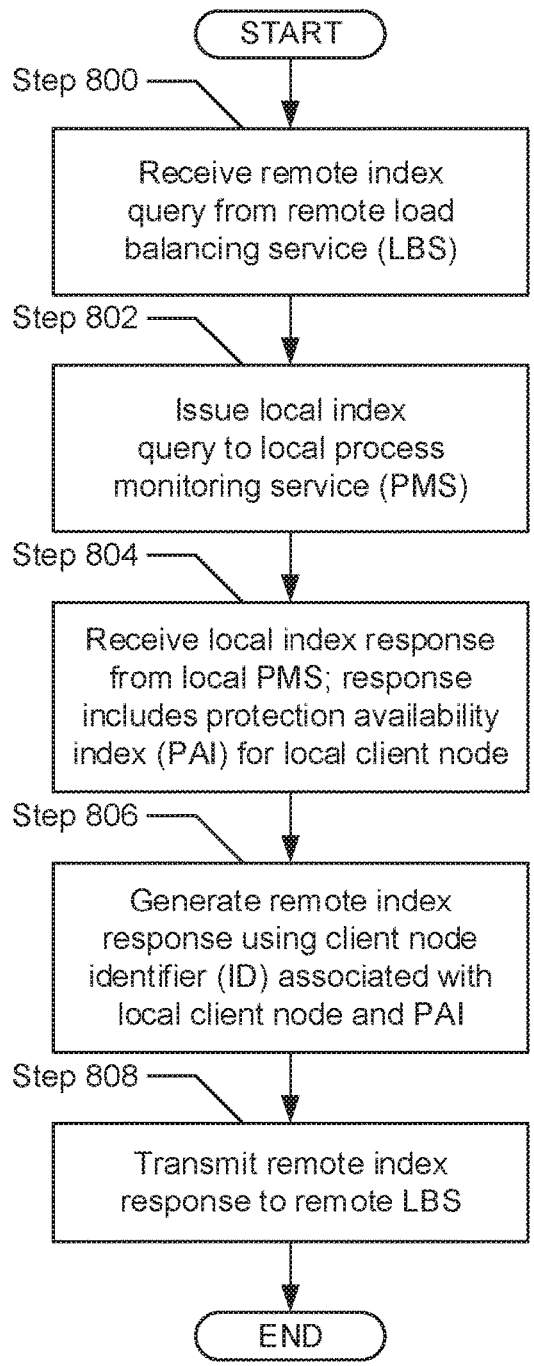
FIG. 8 shows a flowchart describing a method for processing a remote index query in accordance with one or more embodiments of the invention.

FIG. 8 shows a flowchart describing a method for processing a remote index query in accordance with one or more embodiments of the invention. The various steps outlined below may be performed by the load balancing service (LBS) residing on any client node (see e.g., FIG. 1B). Further, while the various steps in the flowchart are presented and described sequentially, one of ordinary skill will appreciate that some or all steps may be executed in different orders, may be combined or omitted, and some or all steps may be executed in parallel.

Turning to FIG. 8, in Step 800, a remote index query is received. In one embodiment of the invention, the remote index query may be received from a remote LBS. A remote LBS may represent a LBS that may be executing on a different client node than the client node on which the local LBS (which may be performing the method disclosed in FIG. 8) may be executing. Further, the remote index query may pertain to obtaining a protection availability index (PAI) (described below) respective to a local client node, where the local client node is the client node on which the local LBS may be executing.

In Step 802, in response to the remote index query (received in Step 800), a local index query is subsequently issued to a local process monitoring service (PMS). In one embodiment of the invention, the local PMS may represent the PMS that may be executing on the same client node on which the local LBS (which may be performing the method disclosed in FIG. 8) may also be executing. Further, the local index query may pertain to obtaining a current PAI (described below) for the local client node.

In Step 804, a local index response is received from the local PMS. In one embodiment of the invention, the local index response may represent a reply to the local index query (issued in Step 802). Further, the local index response may include the current PAI for the local client node. The current PAI for the local client node may represent a measure that quantifies a current availability of resources (e.g., compute, memory, storage, network bandwidth, etc.), existing on the local client node, that may be allocated towards performing a backup operation stage (see e.g., FIG. 2) of a database backup operation directed to a target database.

In Step 806, a remote index response is generated. In one embodiment of the invention, the remote index response may represent a reply to the remote index query (received in Step 800). Further, the remote index response may include the current PAI for the local client node (obtained via the local index response received in Step 804) and a client node identifier (ID) assigned to the local client node. Thereafter, in Step 808, the remote index response (generated in Step 806) is subsequently transmitted to the remote LBS from which the remote index query (received in Step 800) had been sent.

Figure 9:
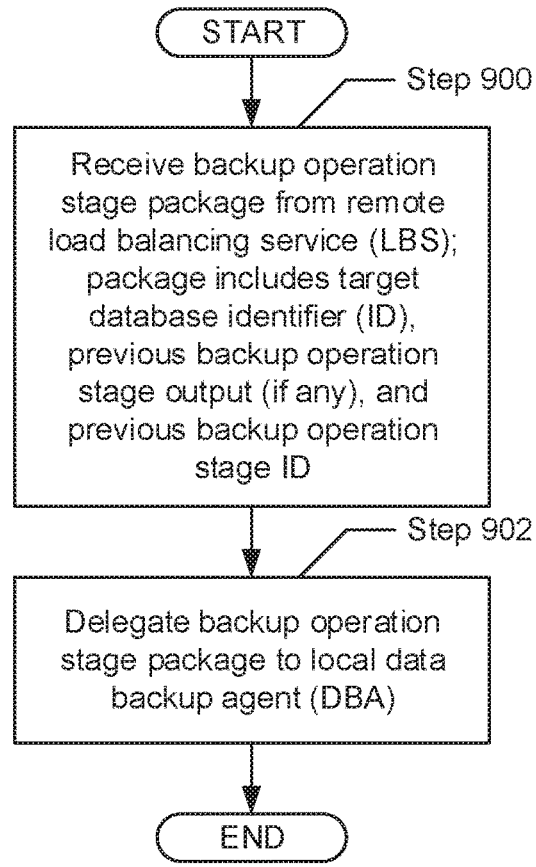
FIG. 9 shows a flowchart describing a method for processing a backup operation stage package in accordance with one or more embodiments of the invention.

FIG. 9 shows a flowchart describing a method for processing a backup operation stage package in accordance with one or more embodiments of the invention. The various steps outlined below may be performed by the load balancing service (LBS) residing on any client node (see e.g., FIG. 1B). Further, while the various steps in the flowchart are presented and described sequentially, one of ordinary skill will appreciate that some or all steps may be executed in different orders, may be combined or omitted, and some or all steps may be executed in parallel.

Turning to FIG. 9, in Step 900, a backup operation stage package is received. In one embodiment of the invention, the backup operation stage package may have been received from a remote LBS—i.e., a LBS executing on a different client node (i.e., a remote client node) than the client node on which the local LBS (which may be performing the method disclosed in FIG. 9) may be executing. Further, the backup operation stage package may include, but is not limited to: (a) a target database identifier (ID) associated with a target database to which a database backup operation is directed; (b) a previous backup operation stage ID associated with a previously performed backup operation stage (if any) (see e.g., FIG. 2); and (c) a previous backup operation stage output (if any) yielded from the previously performed backup operation stage. Moreover, aforementioned previously performed backup operation stage (if any) may have been executed at the remote client node. Thereafter, in Step 902, the backup operation stage package (received in Step 900) is delegated to a local data backup agent (DBA) for processing. In one embodiment of the invention, the local LBS may represent a DBA that may be executing on the same client node on which the local LBS (which may be performing the method disclosed in FIG. 9) may also be executing.

FIG. 10 shows a computing system in accordance with one or more embodiments of the invention. The computing system (1000) may include one or more computer processors (1002), non-persistent storage (1004) (e.g., volatile memory, such as random access memory (RAM), cache memory), persistent storage (1006) (e.g., a hard disk, an optical drive such as a compact disk (CD) drive or digital versatile disk (DVD) drive, a flash memory, etc.), a communication interface (1012) (e.g., Bluetooth interface, infrared interface, network interface, optical interface, etc.), input devices (1010), output devices (1008), and numerous other elements (not shown) and functionalities. Each of these components is described below.

In one embodiment of the invention, the computer processor(s) (1002) may be an integrated circuit for processing instructions. For example, the computer processor(s) may be one or more cores or micro-cores of a processor. The computing system (1000) may also include one or more input devices (1010), such as a touchscreen, keyboard, mouse, microphone, touchpad, electronic pen, or any other type of input device. Further, the communication interface (1012) may include an integrated circuit for connecting the computing system (1000) to a network (not shown) (e.g., a local area network (LAN), a wide area network (WAN) such as the Internet, mobile network, or any other type of network) and/or to another device, such as another computing device.

In one embodiment of the invention, the computing system (1000) may include one or more output devices (1008), such as a screen (e.g., a liquid crystal display (LCD), a plasma display, touchscreen, cathode ray tube (CRT) monitor, projector, or other display device), a printer, external storage, or any other output device. One or more of the output devices may be the same or different from the input device(s). The input and output device(s) may be locally or remotely connected to the computer processor(s) (1002), non-persistent storage (1004), and persistent storage (1006). Many different types of computing systems exist, and the aforementioned input and output device(s) may take other forms.

Software instructions in the form of computer readable program code to perform embodiments of the invention may be stored, in whole or in part, temporarily or permanently, on a non-transitory computer readable medium such as a CD, DVD, storage device, a diskette, a tape, flash memory, physical memory, or any other computer readable storage medium. Specifically, the software instructions may correspond to computer readable program code that, when executed by a processor(s), is configured to perform one or more embodiments of the invention.

Figure 11A:
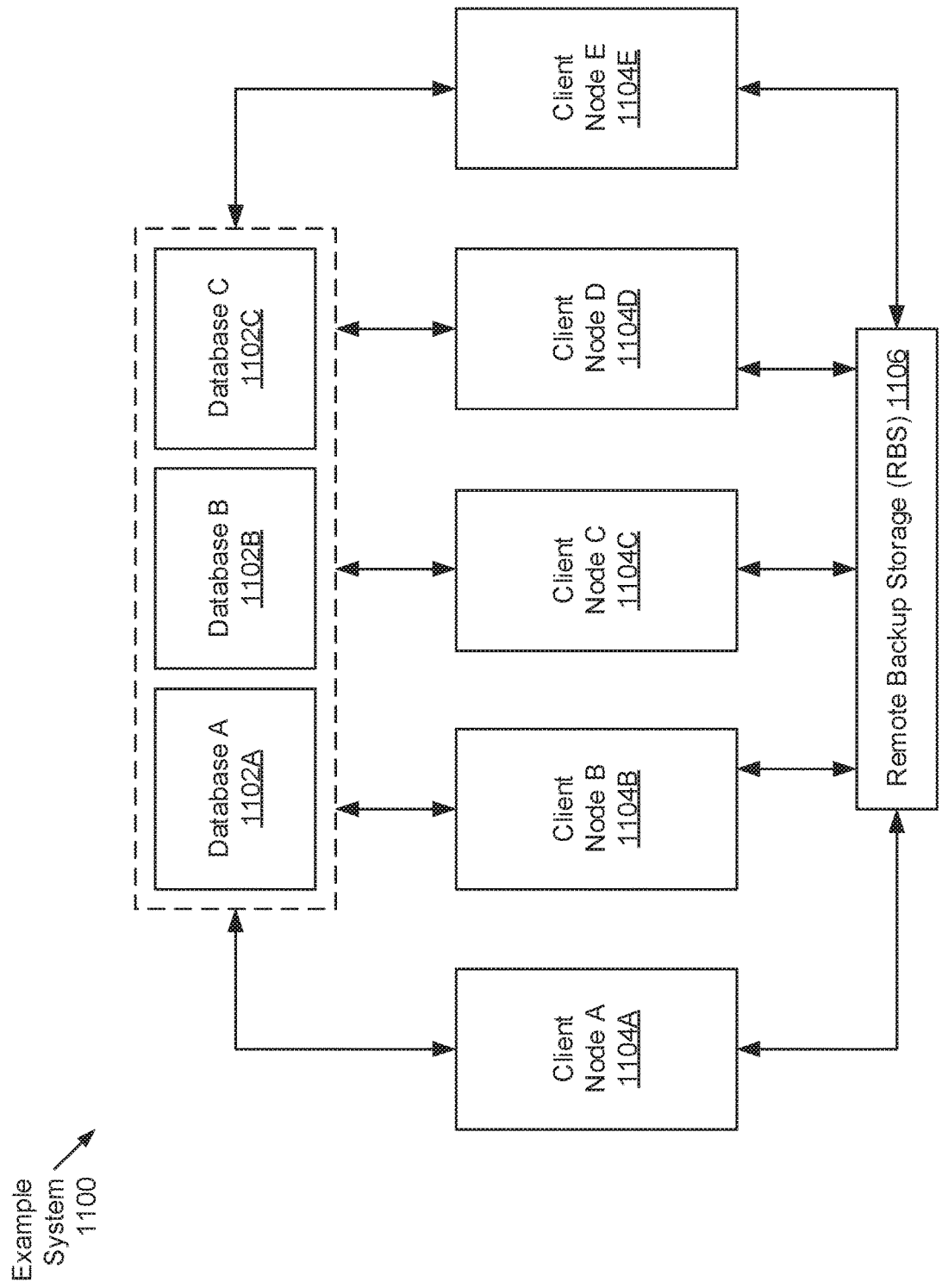
FIGS. 11A-11Q show an example scenario in accordance with one or more embodiments of the invention.
Figure 11B:
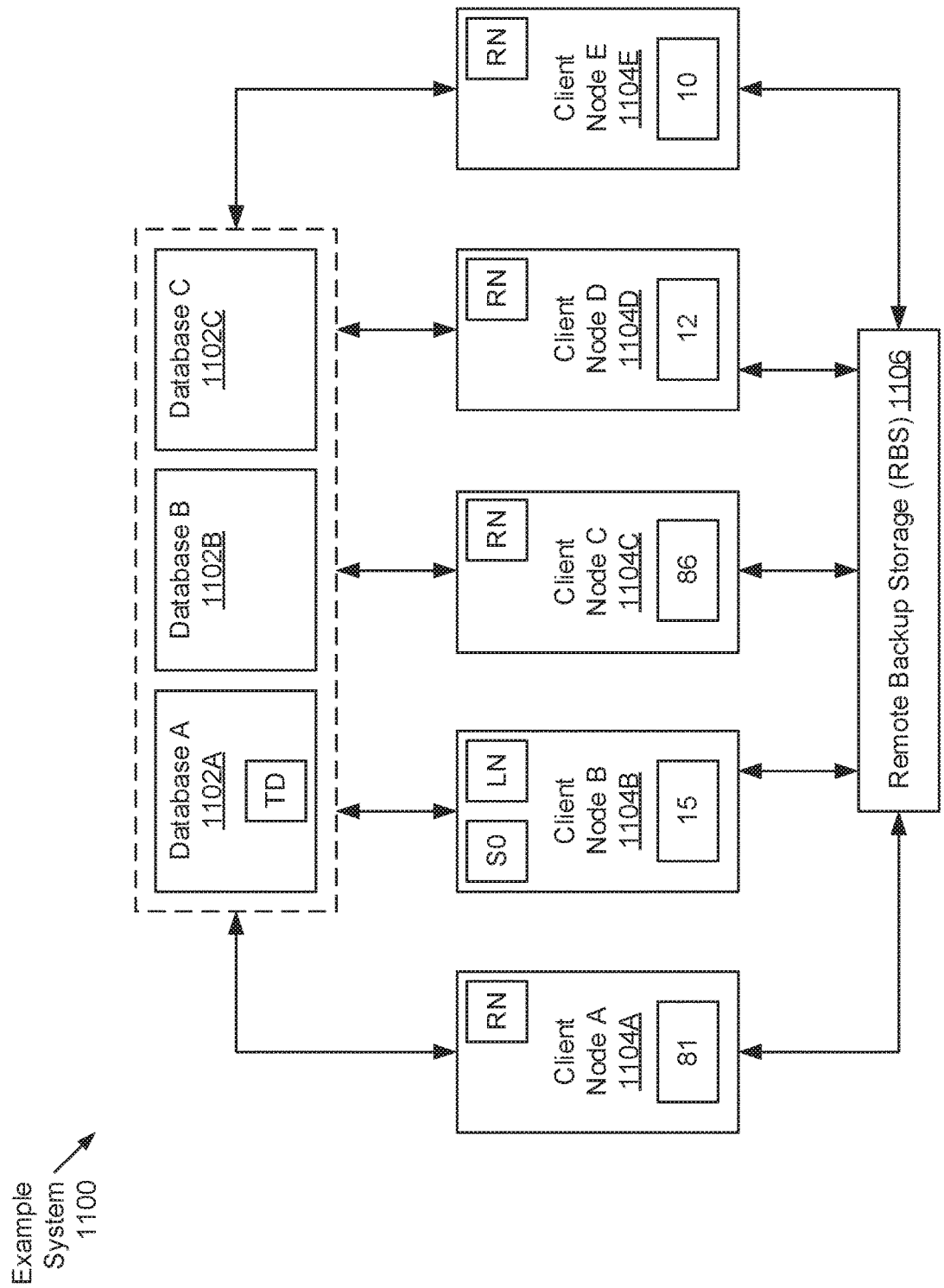
Figure 11C:
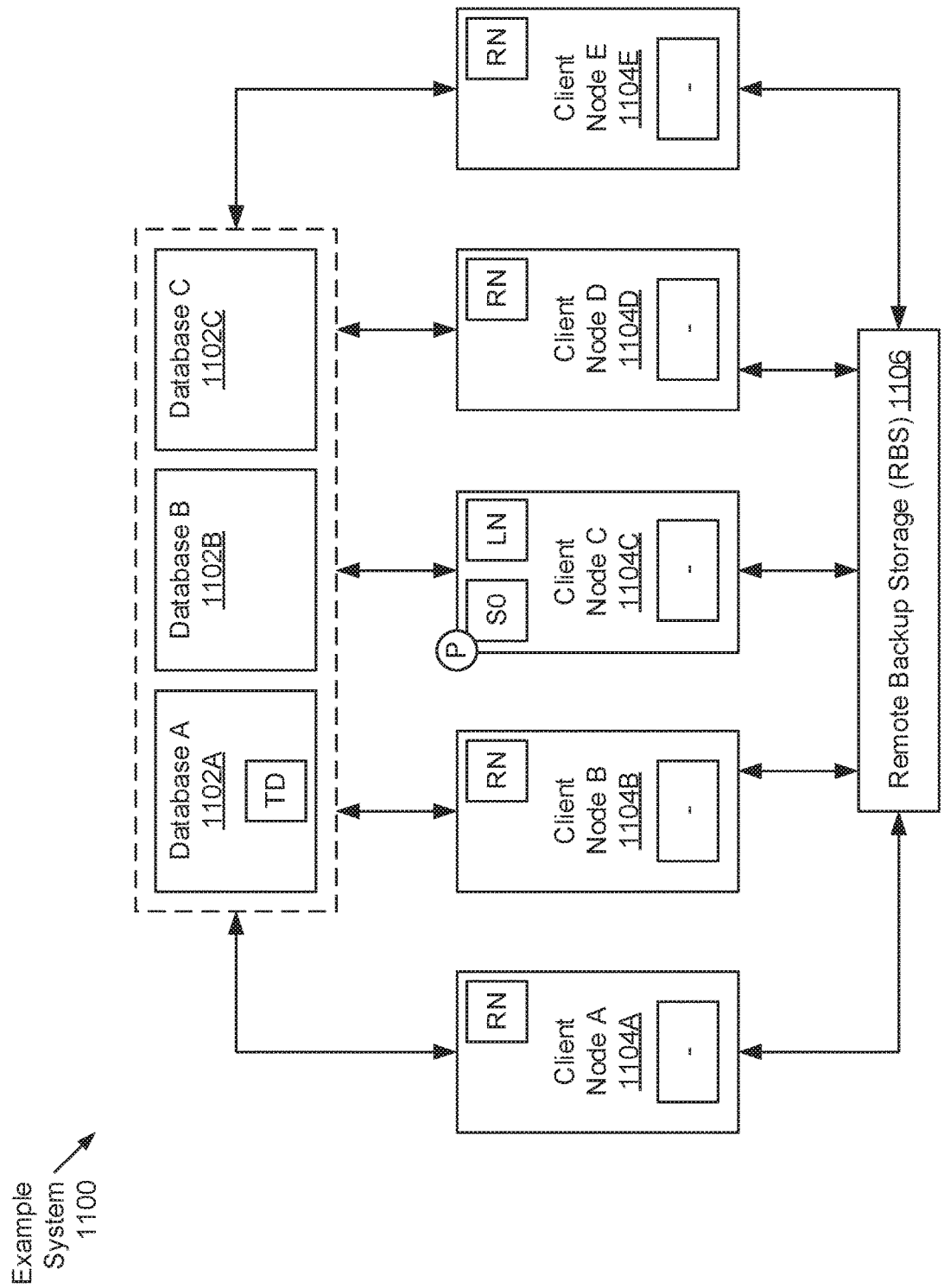
Figure 11D:
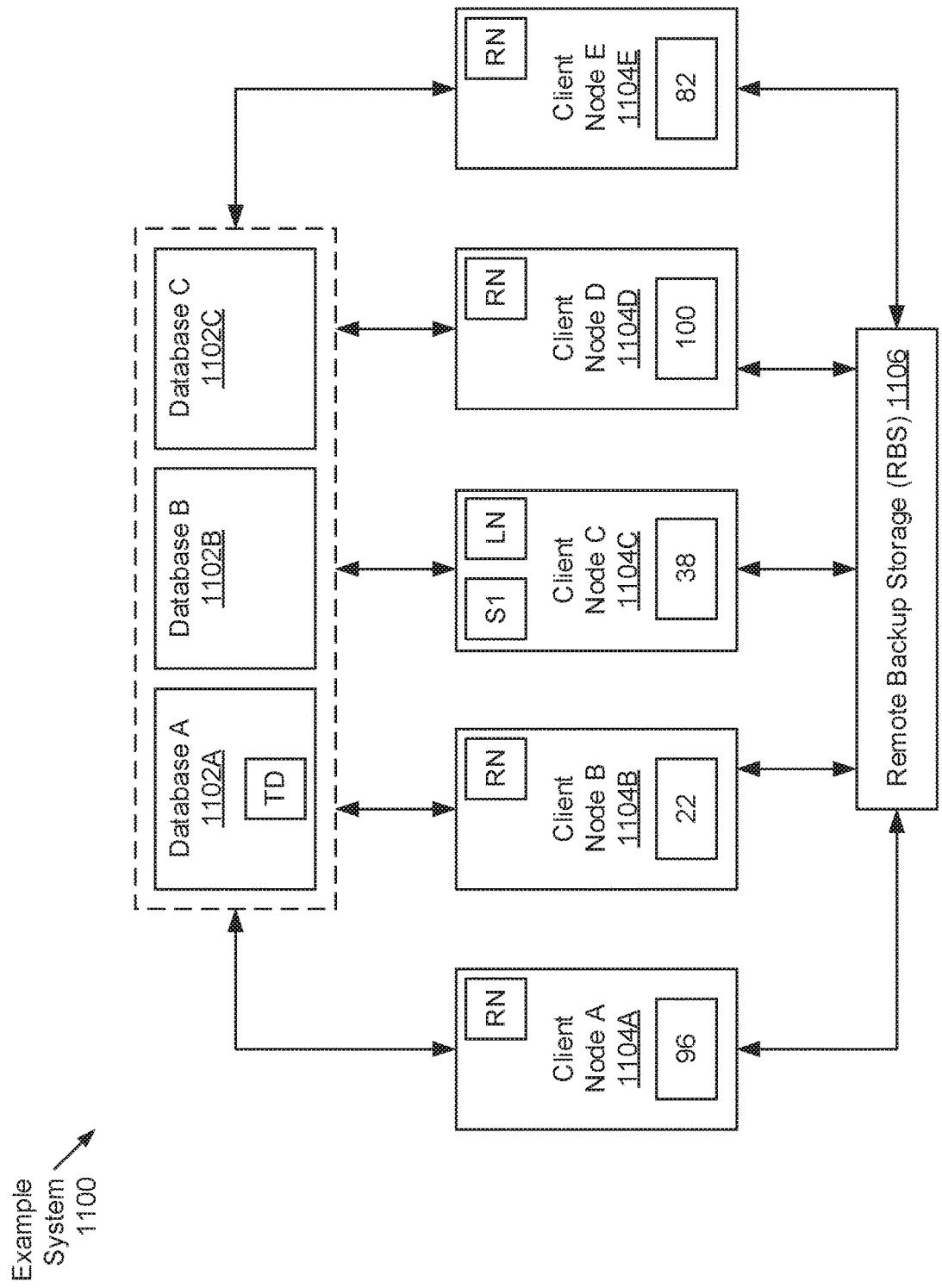
Figure 11E:
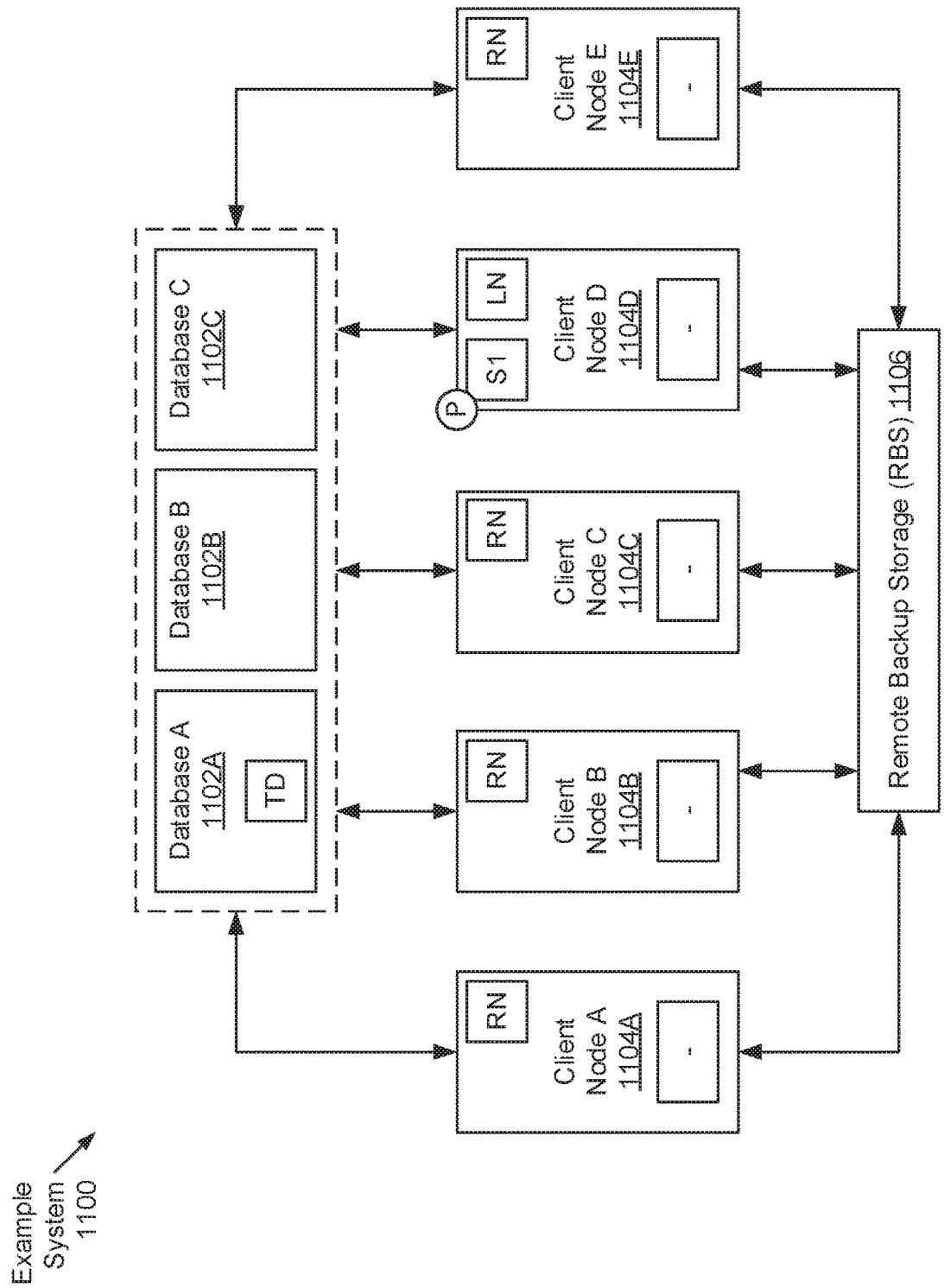
Figure 11F:
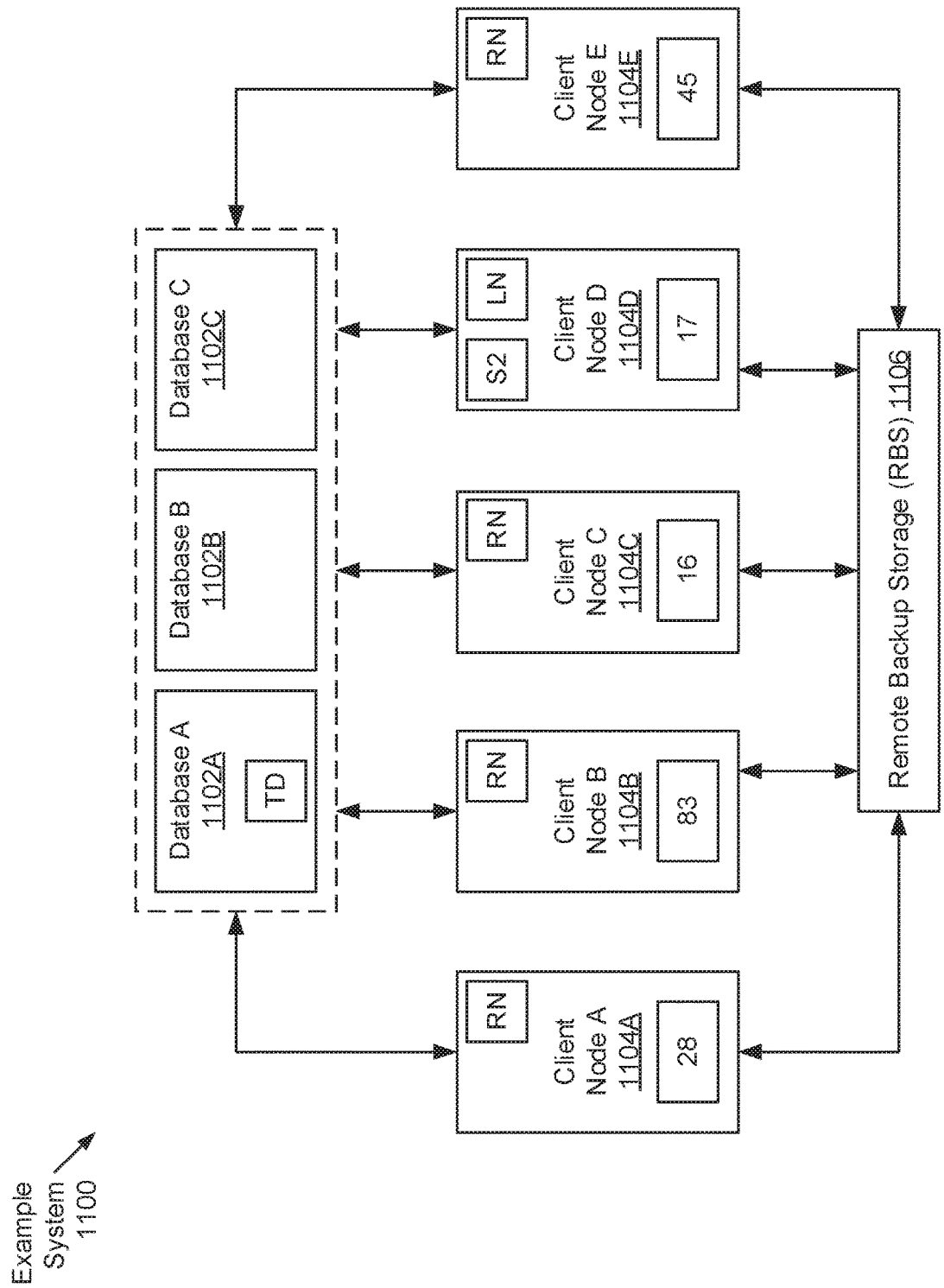
Figure 11G:
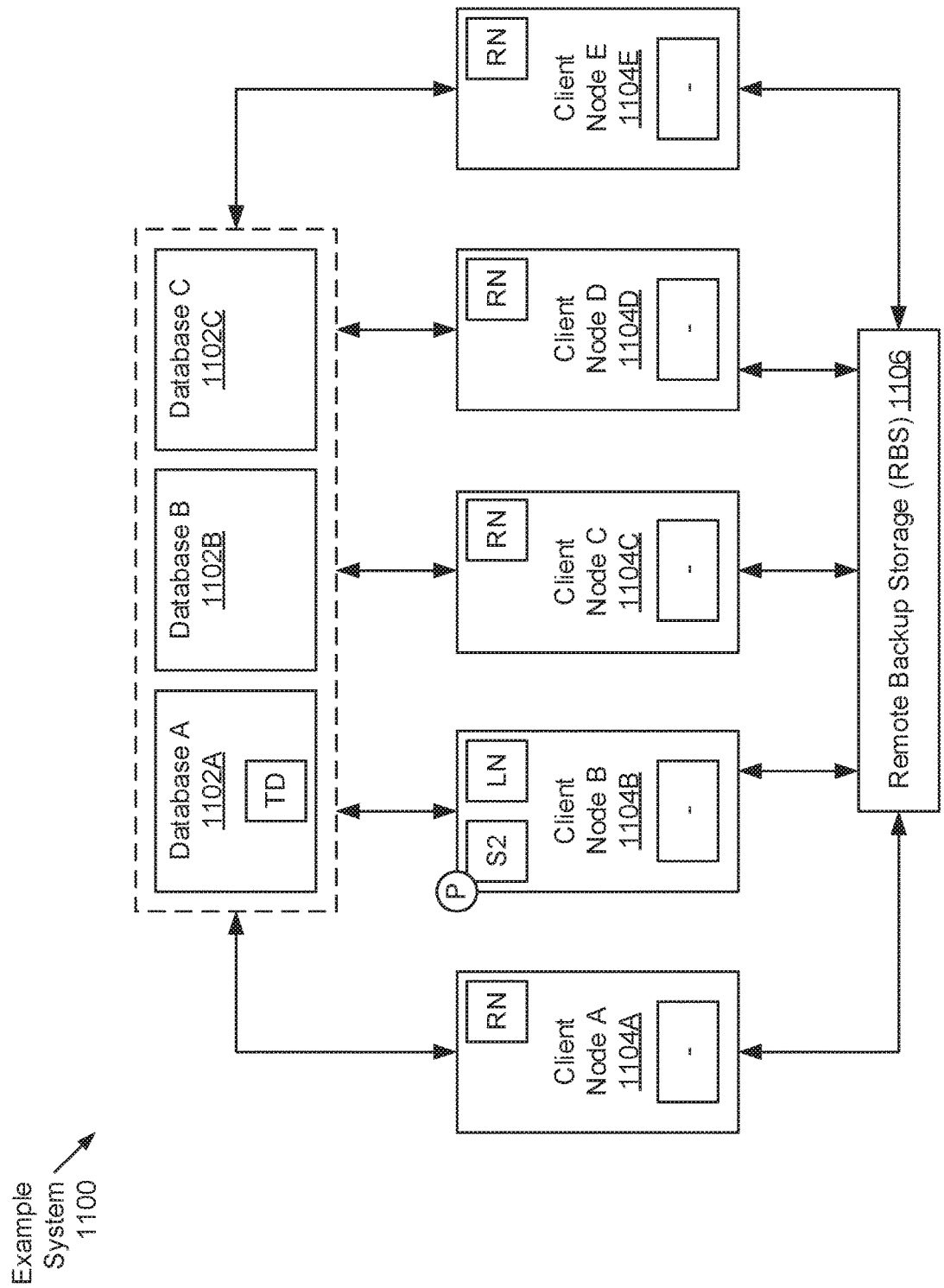
Figure 11H:
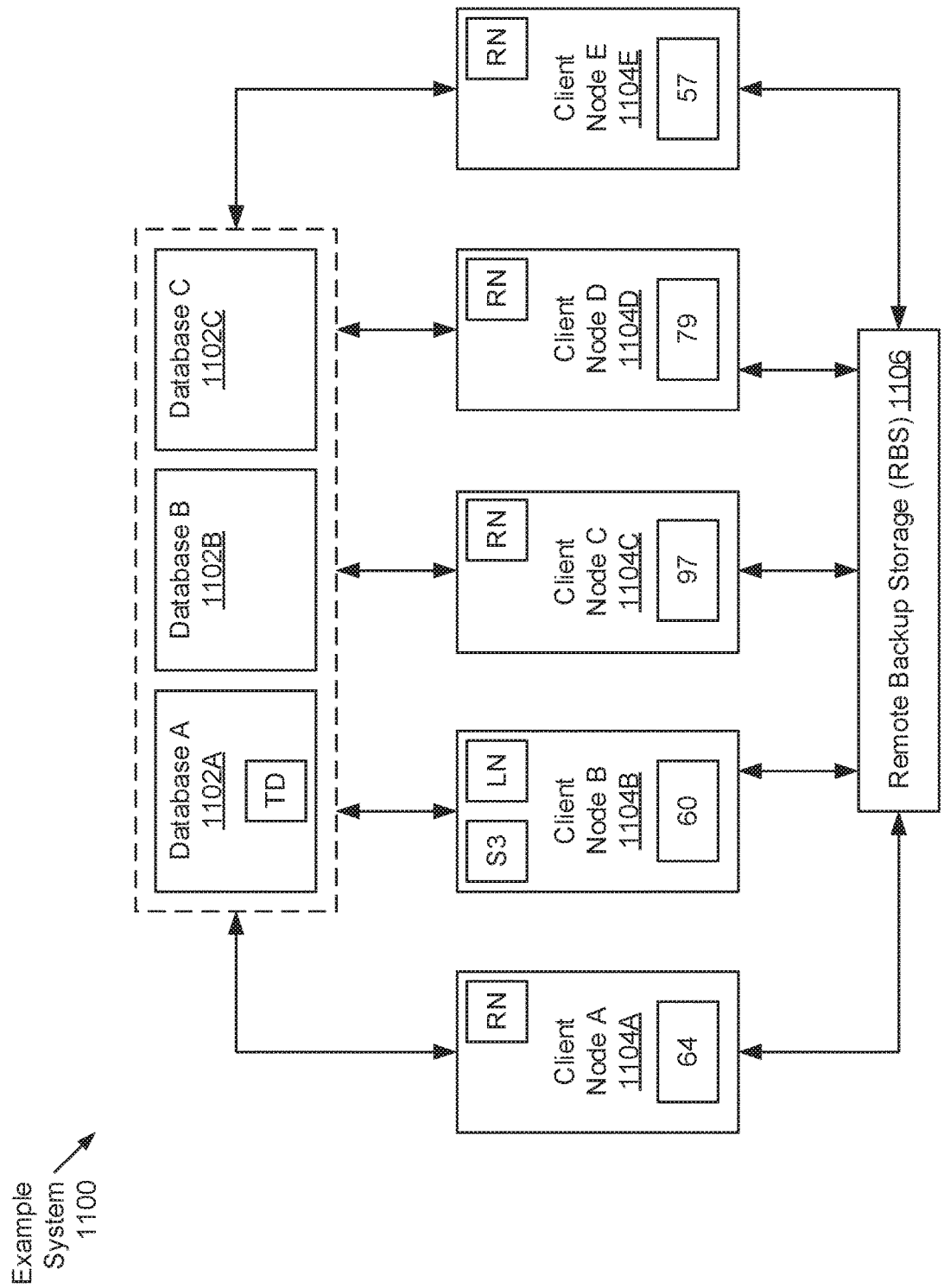
Figure 11I:
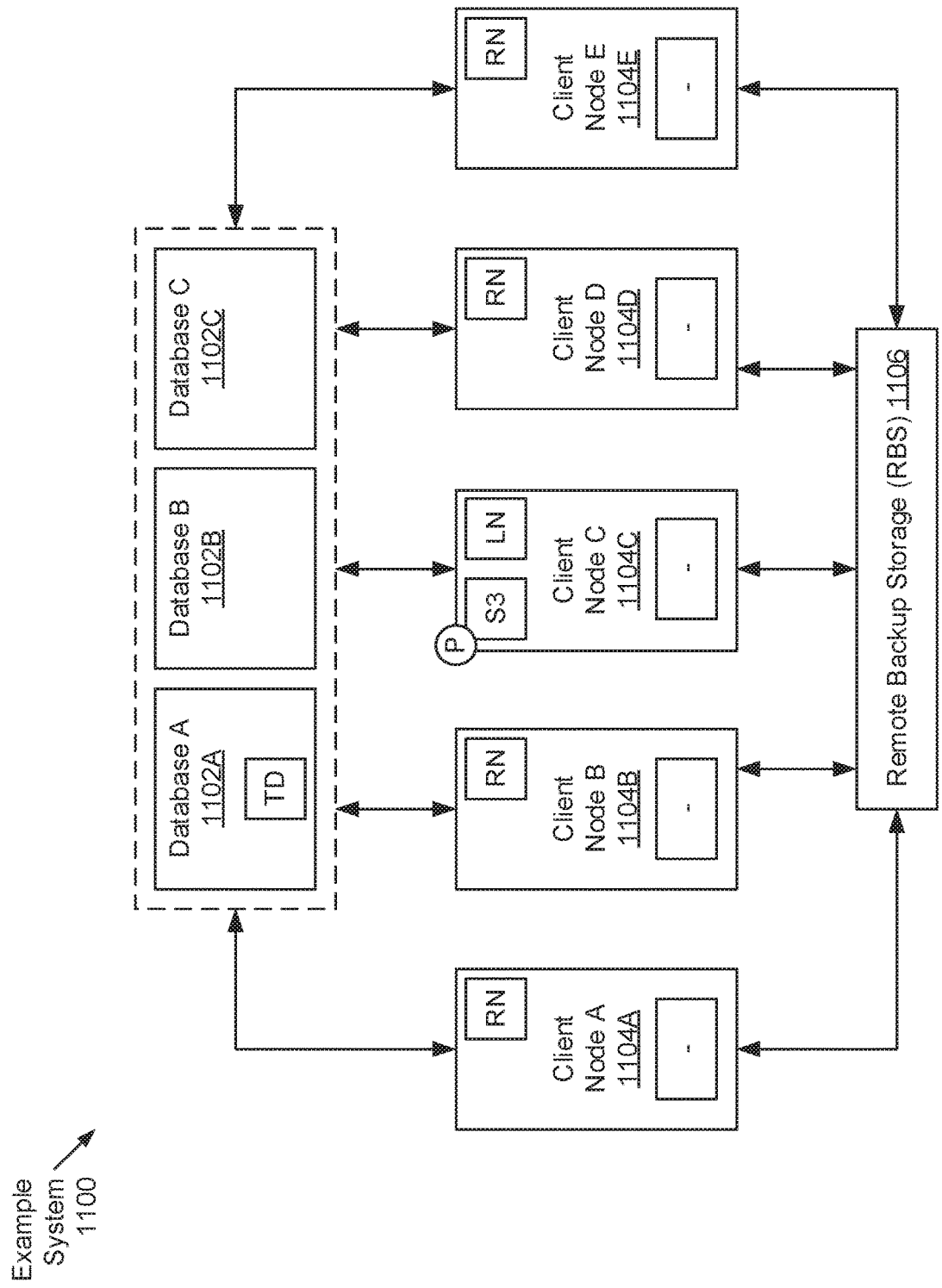
Figure 11J:
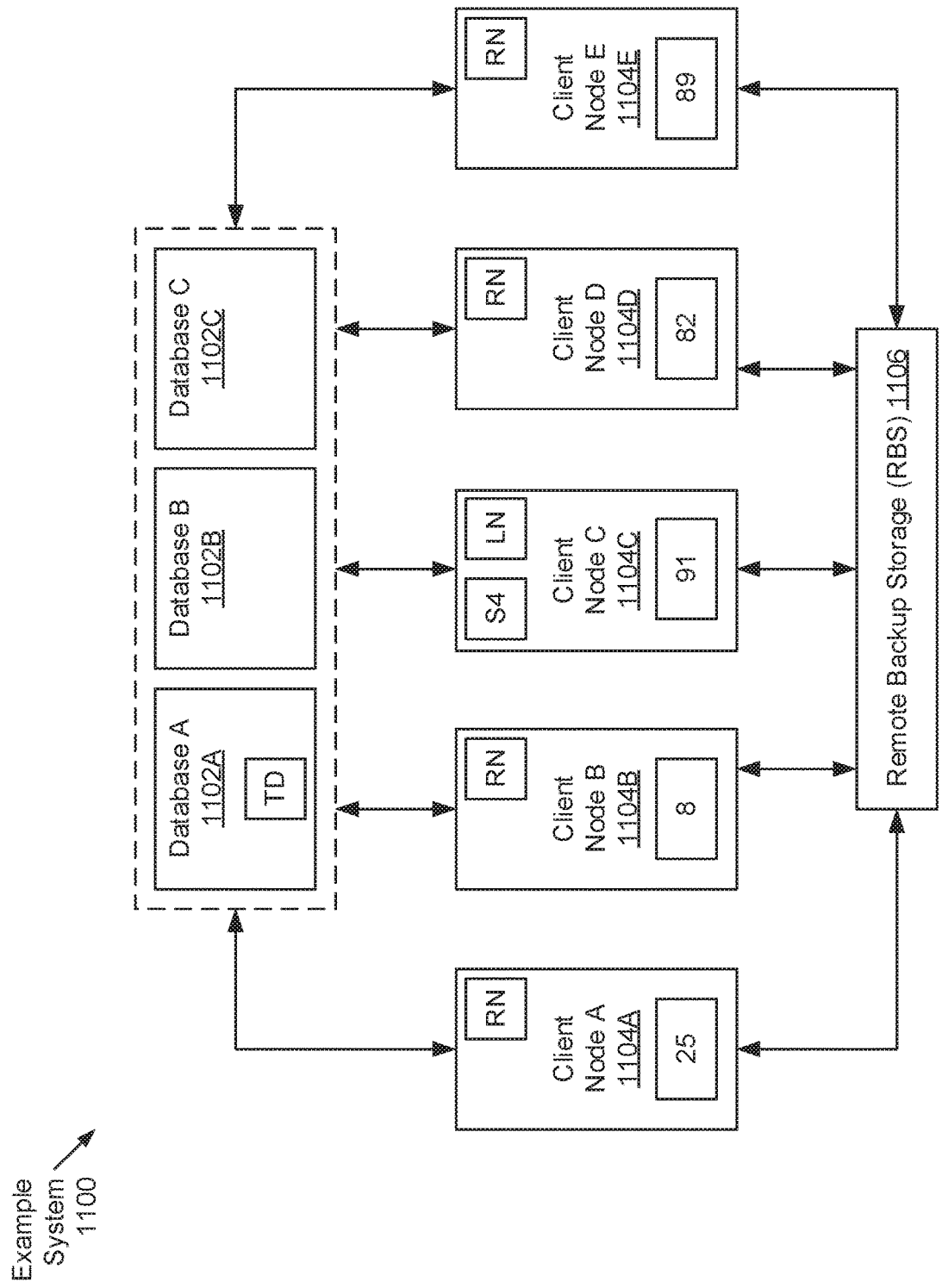
Figure 11K:
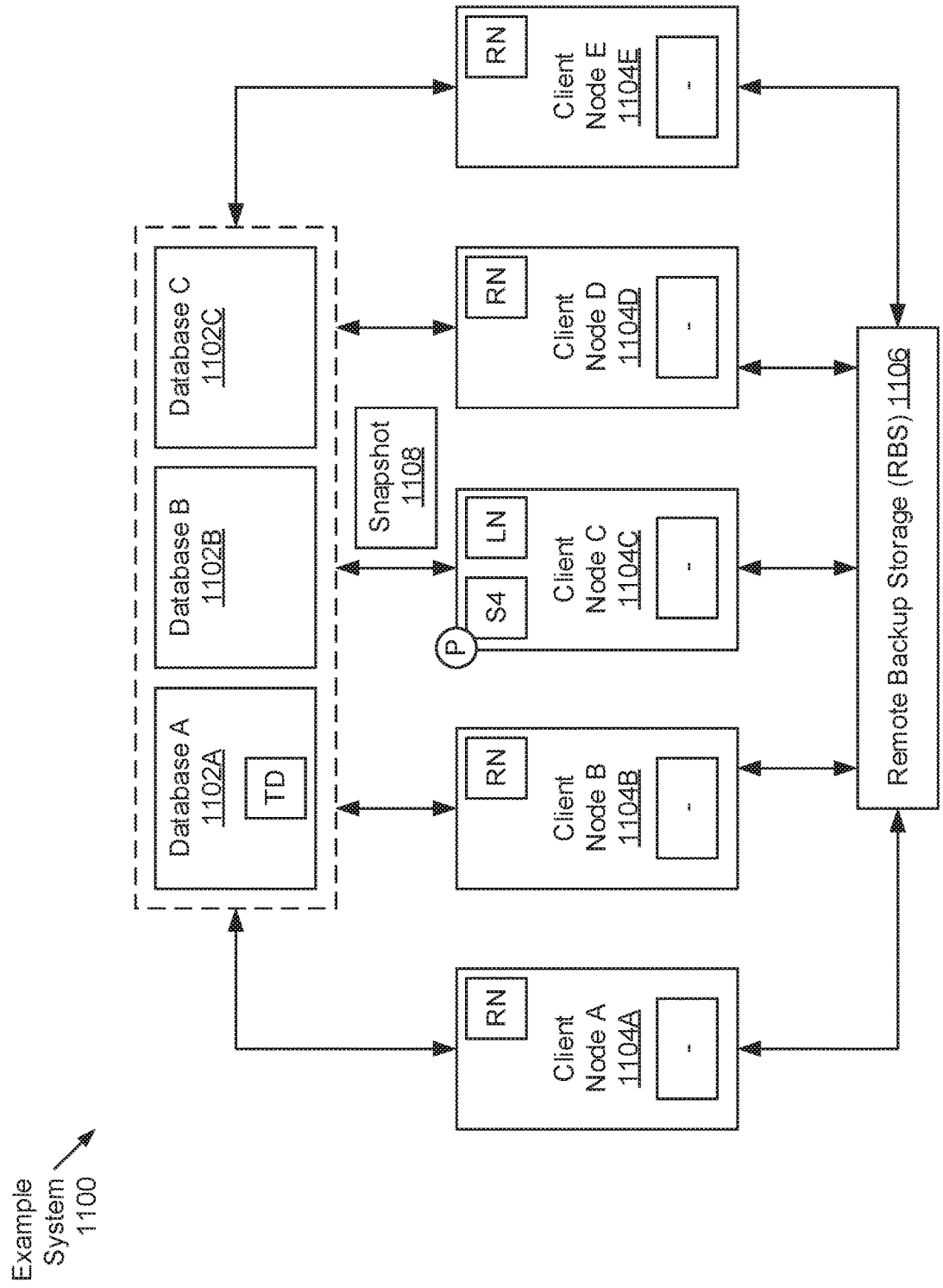
Figure 11L:
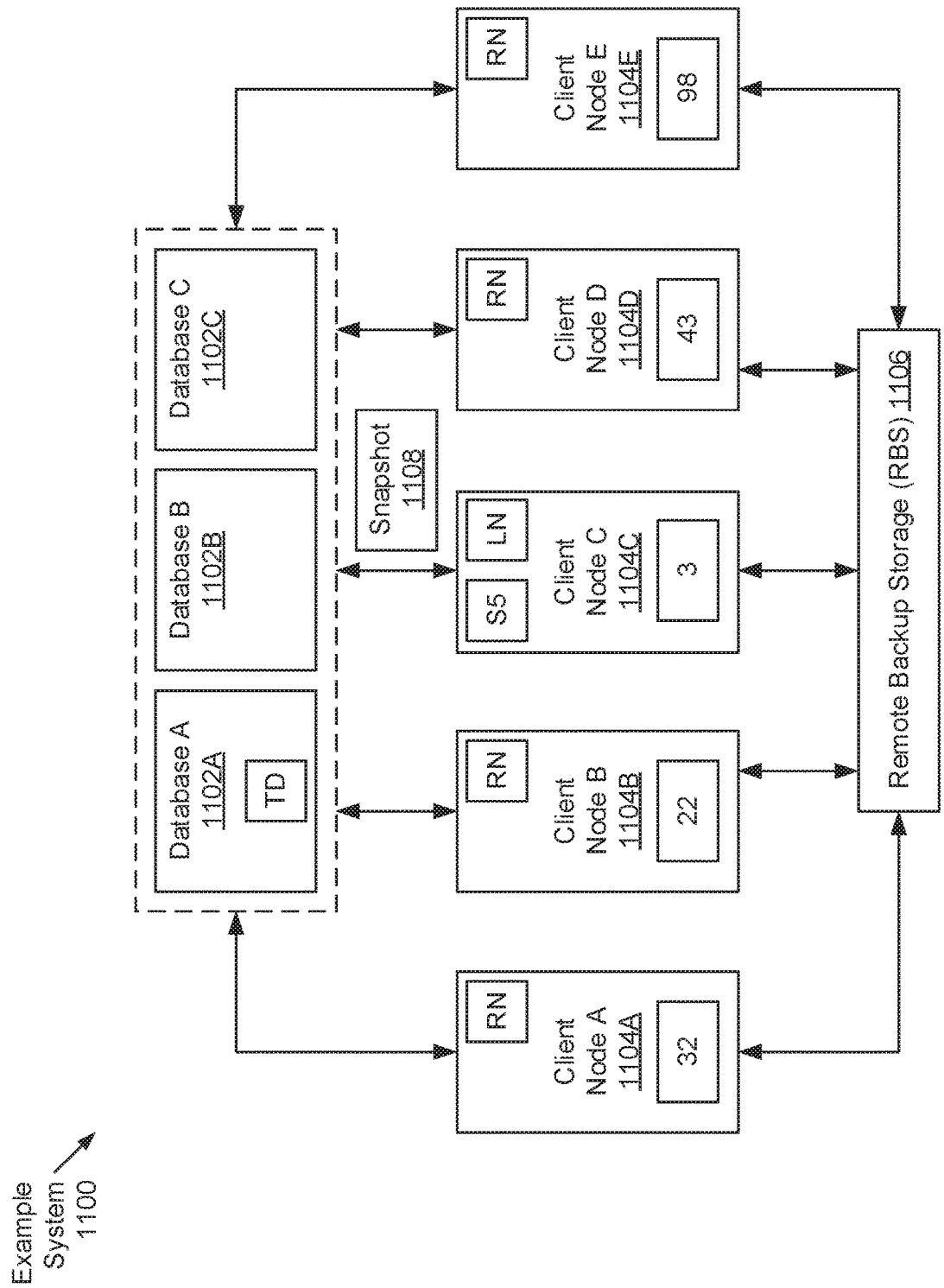
Figure 11M:
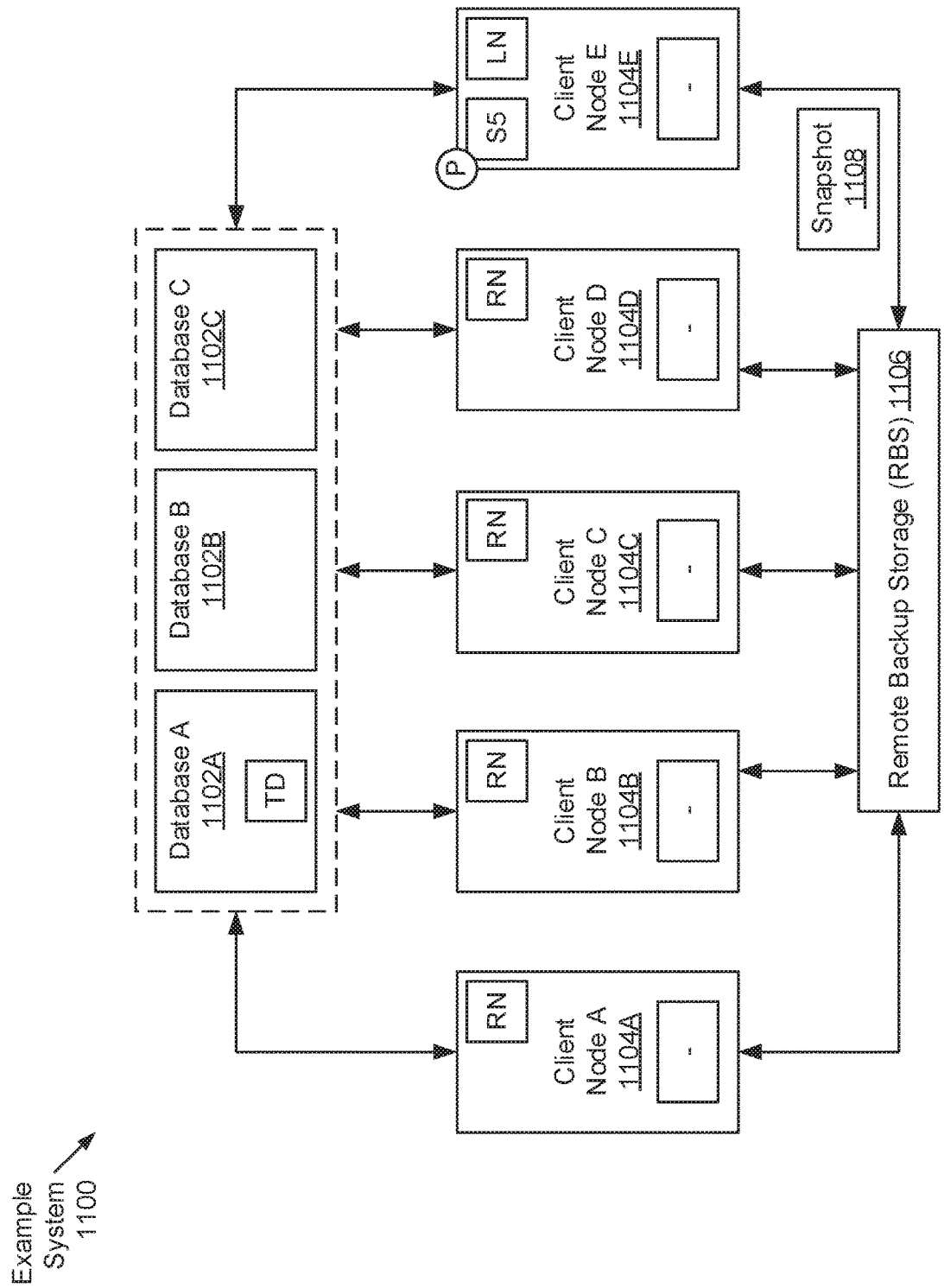
Figure 11N:
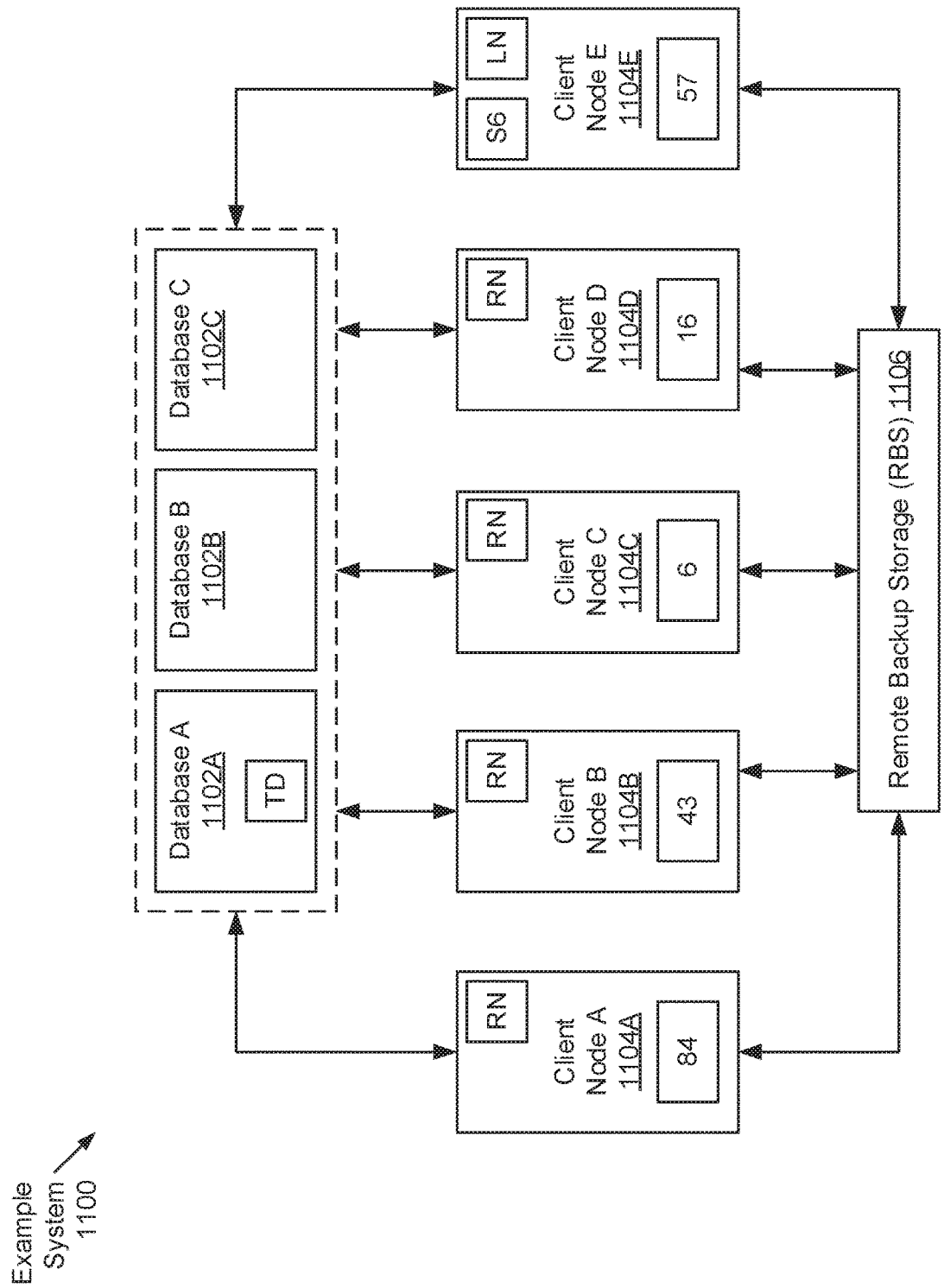
Figure 11O:
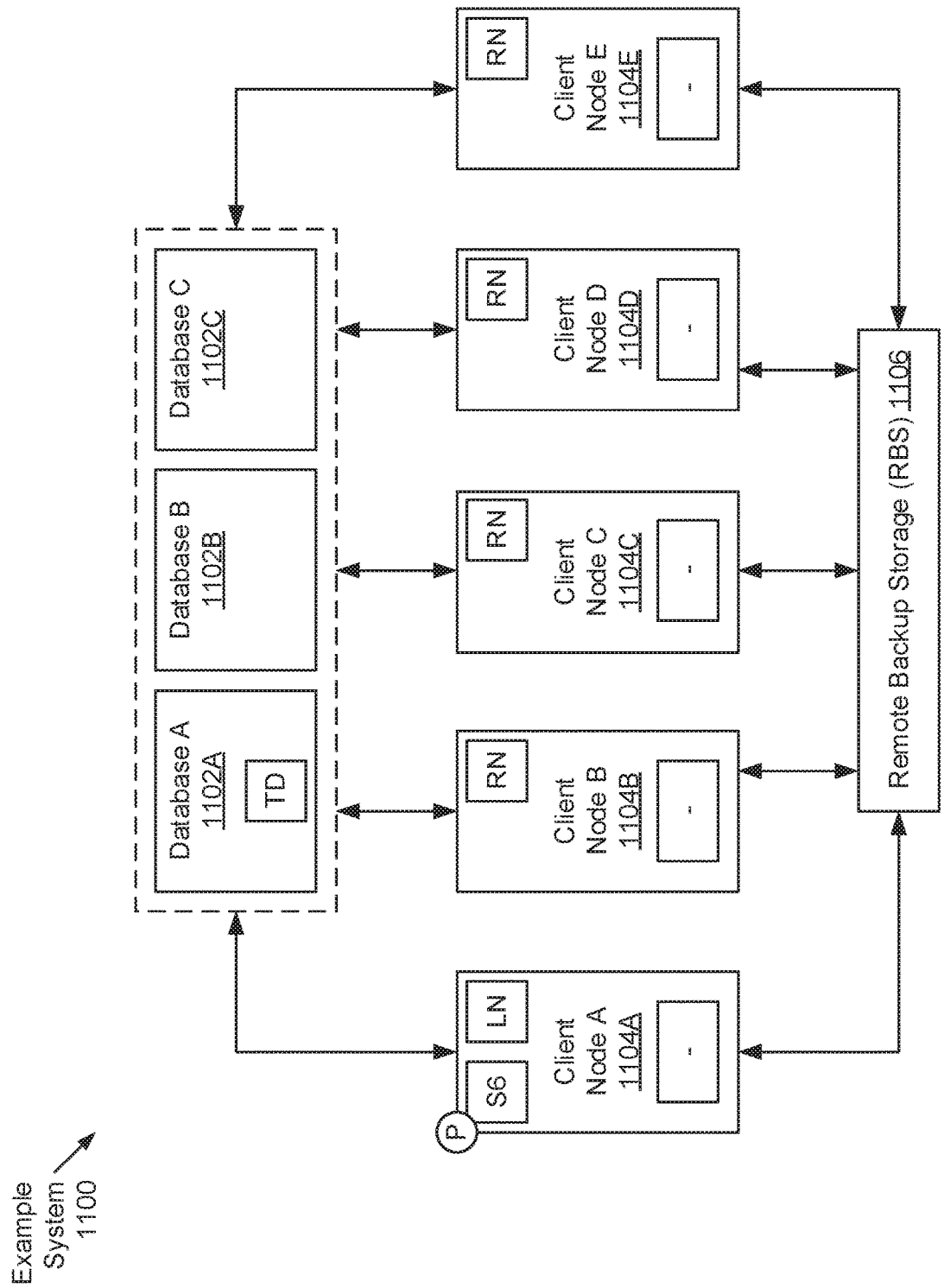
Figure 11P:
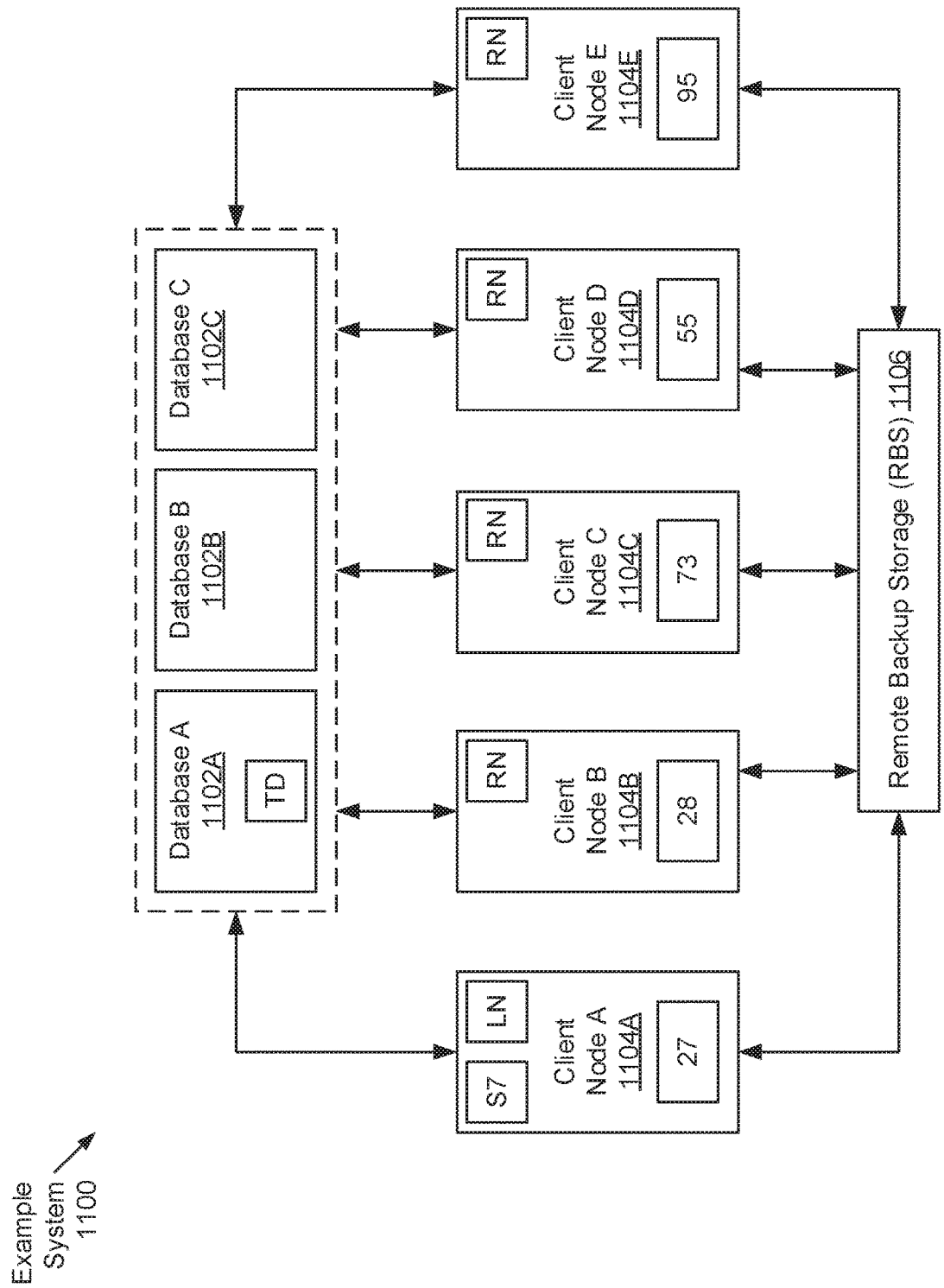
Figure 11Q:
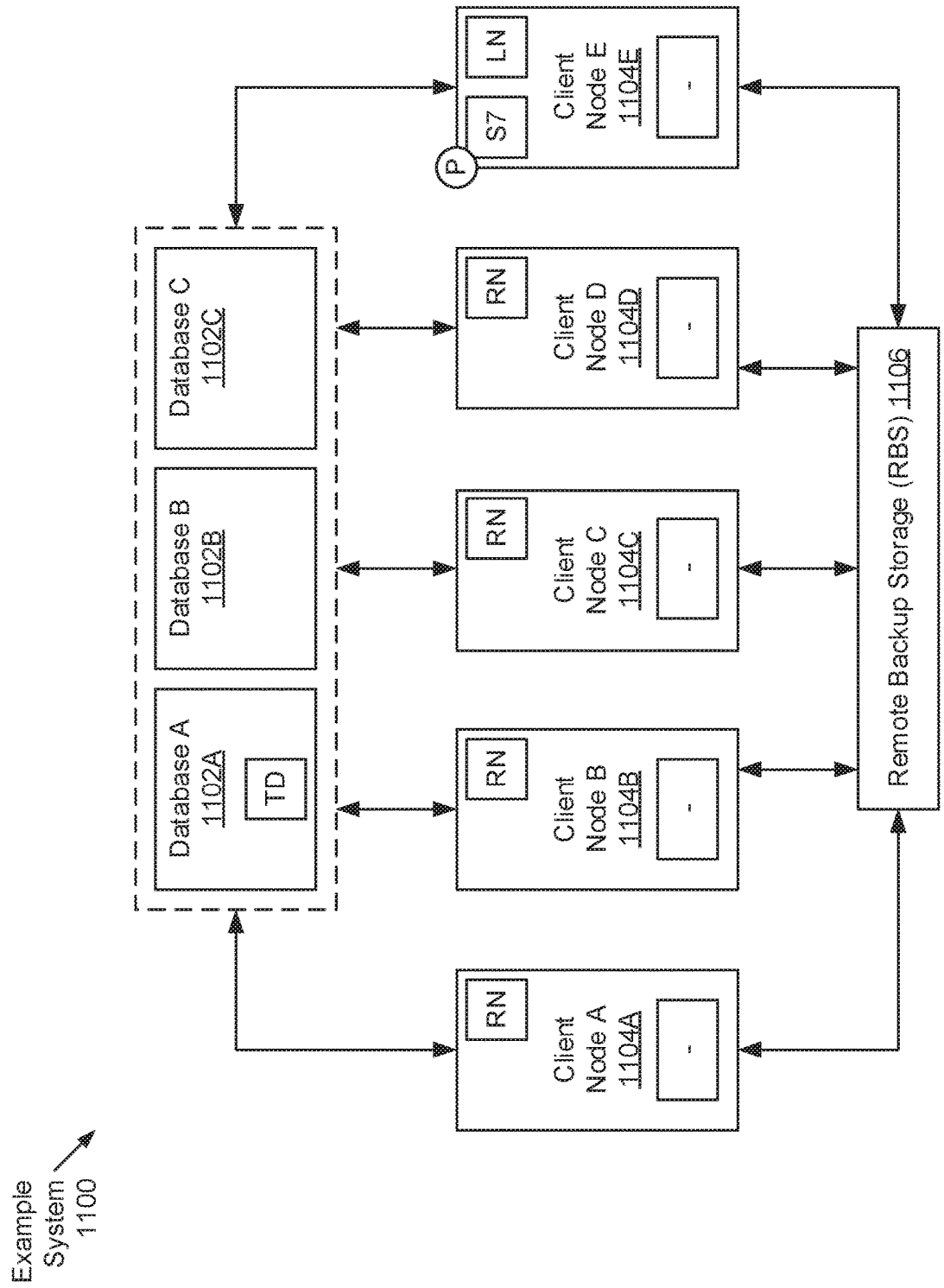

FIGS. 11A-11Q show an example scenario in accordance with one or more embodiments of the invention. The following example scenario, presented in conjunction with components shown in FIGS. 11A-11Q, is for explanatory purposes only and not intended to limit the scope of the invention.

Turning to FIG. 11A, an example system (1100) is illustrated. The example system (1100) includes three databases (1102A-1102C) operatively connected to five client nodes (1104A-1104E), which collectively form a load balancing cluster (not annotated). The client nodes (1104A-1104E), in turn, are operatively connected to a remote backup storage (RBS) (1106).

Turning to FIG. 11B, for the example scenario, consider a database backup operation has been instantiated on the second client node (1104B) by a user or administrator. The database backup operation is directed to the first database (1102A), which is henceforth identified as the target database. Further, at least with respect to determining which client node should perform a current backup operation stage—i.e., Stage 0 (S0)—of the database backup operation, the second client node (1104B) is identified as the local client node, whereas the remaining client nodes (1104A, 1104C-1104E) are identified as remote client nodes. Subsequently, current protection availability indices (PAIs)—e.g., {81, 15, 86, 12, 10}—for the local and remote client nodes are queried and received by the second client node (1104B).

Turning to FIG. 11C, based on the obtained current PAIs for the local and remote client nodes, it is determined that the third client node (1104C) (i.e., one of the remote client nodes) is associated with the highest or greatest current PAI. Accordingly, the second client node (1104B) transmits any information necessary to perform the current backup operation stage—i.e., Stage 0 (S0)—of the database backup operation to the third client node (1104C). Hereafter, at least with respect to performing the current backup operation stage, the third client node (1104C) is identified as the local client node, whereas the remaining client nodes (1104A, 1104B, 1104D, 1104E) are identified as remote client nodes. Subsequently, upon receiving the transmitted necessary information from the second client node (1104B), the third client node (1104C) proceeds to perform (P) the current backup operation stage.

Turning to FIG. 11D, after completing the current backup operation stage—i.e., Stage 0 (S0)—of the database backup operation, a determination is made as to which client node should perform a next backup operation stage—i.e., Stage 1 (S1). Accordingly, new current PAIs—e.g., {96, 22, 38, 100, 82}—for the local and remote client nodes are queried and received by the third client node (1104C).

Turning to FIG. 11E, based on the obtained current PAIs for the local and remote client nodes, it is determined that the fourth client node (1104D) (i.e., one of the remote client nodes) is associated with the highest or greatest current PAI. Accordingly, the third client node (1104C) transmits any information necessary to perform the next backup operation stage—i.e., Stage 1 (S1)—of the database backup operation to the fourth client node (1104D). Hereafter, at least with respect to performing the next backup operation stage, the fourth client node (1104D) is identified as the local client node, whereas the remaining client nodes (1104A-1104C, 1104E) are identified as remote client nodes. Subsequently, upon receiving the transmitted necessary information from the third client node (1104C), the fourth client node (1104D) proceeds to perform (P) the next backup operation stage (i.e., which has become the new current backup operation stage).

Turning to FIG. 11F, after completing the current backup operation stage—i.e., Stage 1 (S1)—of the database backup operation, a determination is made as to which client node should perform a next backup operation stage—i.e., Stage 2 (S2). Accordingly, new current PAIs—e.g., {28, 83, 16, 17, 45}—for the local and remote client nodes are queried and received by the fourth client node (1104D).

Turning to FIG. 11G, based on the obtained current PAIs for the local and remote client nodes, it is determined that the second client node (1104B) (i.e., one of the remote client nodes) is associated with the highest or greatest current PAI. Accordingly, the fourth client node (1104D) transmits any information necessary to perform the next backup operation stage—i.e., Stage 2 (S2)—of the database backup operation to the second client node (1104B). Hereafter, at least with respect to performing the next backup operation stage, the second client node (1104B) is identified as the local client node, whereas the remaining client nodes (1104A, 1104C-1104E) are identified as remote client nodes. Subsequently, upon receiving the transmitted necessary information from the fourth client node (1104D), the second client node (1104B) proceeds to perform (P) the next backup operation stage (i.e., which has become the new current backup operation stage).

Turning to FIG. 11H, after completing the current backup operation stage—i.e., Stage 2 (S2)—of the database backup operation, a determination is made as to which client node should perform a next backup operation stage—i.e., Stage 3 (S3). Accordingly, new current PAIs—e.g., {64, 60, 97, 79, 57}—for the local and remote client nodes are queried and received by the second client node (1104B).

Turning to FIG. 11I, based on the obtained current PAIs for the local and remote client nodes, it is determined that the third client node (1104C) (i.e., one of the remote client nodes) is associated with the highest or greatest current PAI. Accordingly, the second client node (1104B) transmits any information necessary to perform the next backup operation stage—i.e., Stage 3 (S3)—of the database backup operation to the third client node (1104C). Hereafter, at least with respect to performing the next backup operation stage, the third client node (1104C) is identified as the local client node, whereas the remaining client nodes (1104A, 1104B, 1104D, 1104E) are identified as remote client nodes. Subsequently, upon receiving the transmitted necessary information from the second client node (1104B), the third client node (1104C) proceeds to perform (P) the next backup operation stage (i.e., which has become the new current backup operation stage).

Turning to FIG. 11J, after completing the current backup operation stage—i.e., Stage 3 (S3)—of the database backup operation, a determination is made as to which client node should perform a next backup operation stage—i.e., Stage 4 (S4). Accordingly, new current PAIs—e.g., {25, 8, 91, 82, 89}—for the local and remote client nodes are queried and received by the third client node (1104C).

Turning to FIG. 11K, based on the obtained current PAIs for the local and remote client nodes, it is determined that the third client node (1104C) (i.e., the local client node) is associated with the highest or greatest current PAI. Accordingly, at least with respect to performing the next backup operation stage, the third client node (1104C) remains as the local client node, whereas the remaining client nodes (1104A, 1104B, 1104D, 1104E) are still identified as remote client nodes. Subsequently, the third client node (1104C) proceeds to perform (P) the next backup operation stage (i.e., which has become the new current backup operation stage). Further, in performing the Stage 4 (S4) backup operation stage, a snapshot (1108) of the target database (i.e., the first database (1102A)) is generated.

Turning to FIG. 11L, after completing the current backup operation stage—i.e., Stage 4 (S4)—of the database backup operation, a determination is made as to which client node should perform a next backup operation stage—i.e., Stage 5 (S5). Accordingly, new current PAIs—e.g., {32, 22, 3, 43, 98}—for the local and remote client nodes are queried and received by the third client node (1104C).

Turning to FIG. 11M, based on the obtained current PAIs for the local and remote client nodes, it is determined that the fifth client node (1104E) (i.e., one of the remote client nodes) is associated with the highest or greatest current PAI.

Accordingly, the third client node (1104C) transmits any information necessary to perform the next backup operation stage—i.e., Stage 5 (S5)—of the database backup operation to the fifth client node (1104E). Hereafter, at least with respect to performing the next backup operation stage, the fifth client node (1104E) is identified as the local client node, whereas the remaining client nodes (1104A-1104D) are identified as remote client nodes. Subsequently, upon receiving the transmitted necessary information from the third client node (1104C), the fifth client node (1104E) proceeds to perform (P) the next backup operation stage (i.e., which has become the new current backup operation stage). Further, in performing the Stage 5 (S5) backup operation stage, the snapshot (1108) of the target database (i.e., the first database (1102A)), generated in the previous backup operation stage, is transferred to the RBS (1106).

Turning to FIG. 11N, after completing the current backup operation stage—i.e., Stage 5 (S5)—of the database backup operation, a determination is made as to which client node should perform a next backup operation stage—i.e., Stage 5 (S5). Accordingly, new current PAIs—e.g., {84, 43, 6, 16, 57}—for the local and remote client nodes are queried and received by the fifth client node (1104E).

Turning to FIG. 11O, based on the obtained current PAIs for the local and remote client nodes, it is determined that the first client node (1104A) (i.e., one of the remote client nodes) is associated with the highest or greatest current PAI. Accordingly, the fifth client node (1104E) transmits any information necessary to perform the next backup operation stage—i.e., Stage 6 (S6)—of the database backup operation to the first client node (1104A). Hereafter, at least with respect to performing the next backup operation stage, the first client node (1104A) is identified as the local client node, whereas the remaining client nodes (1104B-1104E) are identified as remote client nodes. Subsequently, upon receiving the transmitted necessary information from the fifth client node (1104E), the first client node (1104A) proceeds to perform (P) the next backup operation stage (i.e., which has become the new current backup operation stage).

Turning to FIG. 11P, after completing the current backup operation stage—i.e., Stage 6 (S6)—of the database backup operation, a determination is made as to which client node should perform a next backup operation stage—i.e., Stage 7 (S7). Accordingly, new current PAIs—e.g., {27, 28, 73, 55, 95}—for the local and remote client nodes are queried and received by the first client node (1104A).

Turning to FIG. 11Q, based on the obtained current PAIs for the local and remote client nodes, it is determined that the fifth client node (1104E) (i.e., one of the remote client nodes) is associated with the highest or greatest current PAI. Accordingly, the first client node (1104A) transmits any information necessary to perform the next backup operation stage—i.e., Stage 7 (S7)—of the database backup operation to the fifth client node (1104E). Hereafter, at least with respect to performing the next backup operation stage, the fifth client node (1104E) is identified as the local client node, whereas the remaining client nodes (1104A-1104D) are identified as remote client nodes. Subsequently, upon receiving the transmitted necessary information from the first client node (1104A), the fifth client node (1104E) proceeds to perform (P) the next backup operation stage (i.e., which has become the new current backup operation stage). Thereafter, upon completing the current backup operation stage—i.e., Stage 7 (S7)—of the database backup operation, the database backup operation directed to the first database (1102A) completes.

FIGS. 12A-12E show an example global load distribution table (GLDT) in accordance with one or more embodiments of the invention. The following example GLDT, presented in conjunction with components shown in FIGS. 12A-12E, is for explanatory purposes only and not intended to limit the scope of the invention.

Figure 12A:
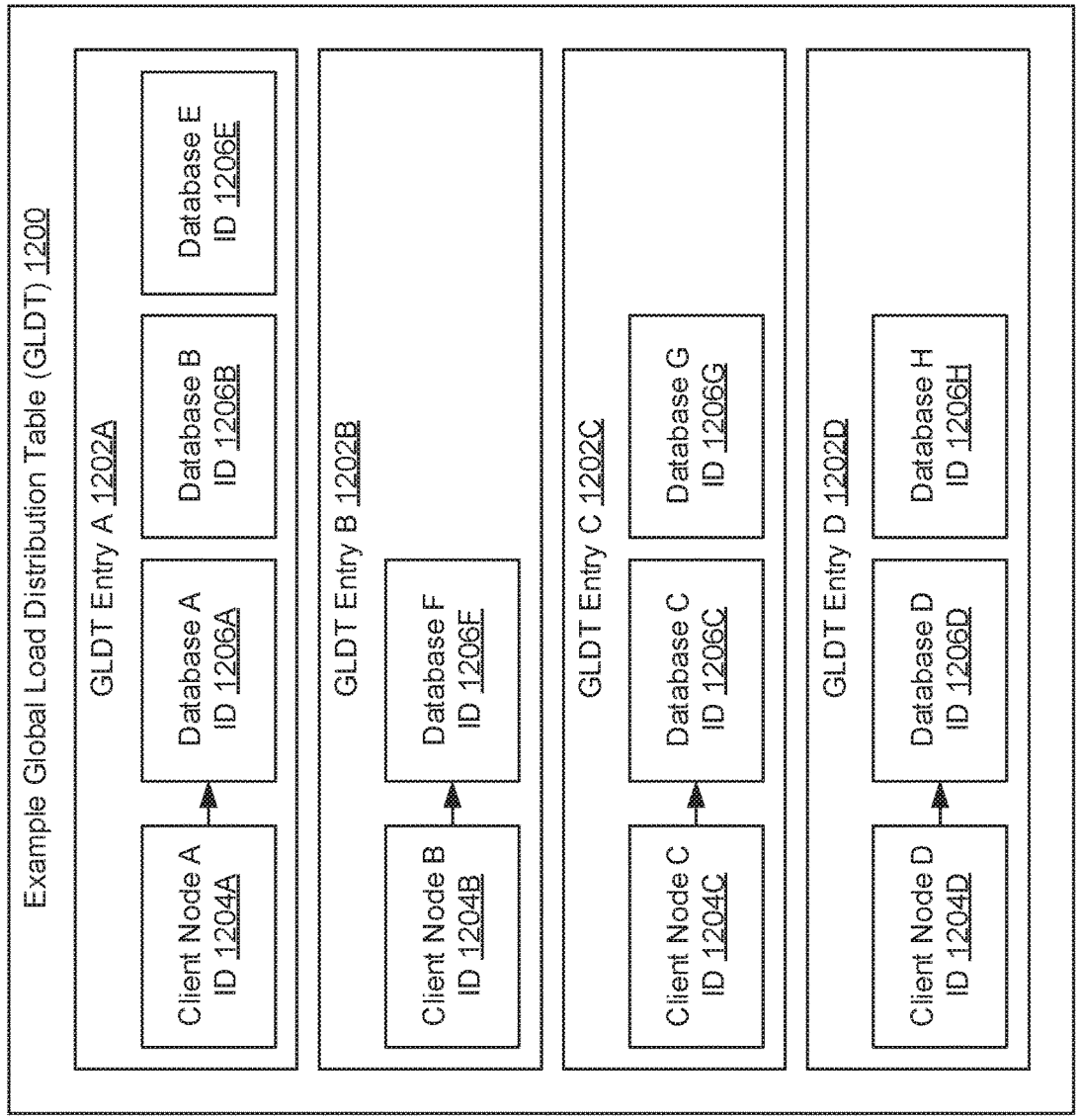
FIGS. 12A-12E show an example global load distribution table in accordance with one or more embodiments of the invention.

Turning to FIG. 12A, an initial state of the example GLDT (1200) is illustrated. The initial state shows that the example GLDT (1200) includes four GLDT entries (1202A-1202D), which each store and track a data rollover ownership mapping for a respective client node. Accordingly, each GLDT entry (1202A-1202D) includes a client node ID (1204A-1204D) associated with their respective client node, and zero or more database IDs (1206A-1206H) associated with zero or more target databases, respectively. Particularly, as shown in FIG. 12A: (a) the first GLDT entry (1202A) maps a first client node ID (1204A) to first, second, and fifth database IDs (1206A, 1206B, 1206E); (b) the second GLDT entry (1202B) maps a second client node ID (1204B) to a sixth database ID (1206F); (c) the third GLDT entry (1202C) maps a third client node ID (1204C) to third and seventh database IDs (1206C, 1206G); and (d) the fourth GLDT entry (1202D) maps a fourth client node ID (1204D) to fourth and eighth database IDs (1206D, 1206H).

Based on this initial state, the example GLDT (1200) reflects that: (i) a first client node (associated with the first client node ID (1204A)) is currently transferring over a snapshot of a first target database (associated with the first database ID (1206A)) to the remote backup storage (RBS) (see e.g., FIG. 1A); (ii) a second client node (associated with the second client node ID (1204B)) is currently transferring over a snapshot of a sixth target database (associated with the sixth database ID (1206F)) to the RBS; (iii) a third client node (associated with the third client node ID (1204C)) is currently transferring over a snapshot of a third target database (associated with the third database ID (1206C)) to the RBS; and (iv) a fourth client node (associated with the fourth client node ID (1204D)) is currently transferring over a snapshot of a fourth target database (associated with the fourth database ID (1206D)) to the RBS.

Figure 12B:
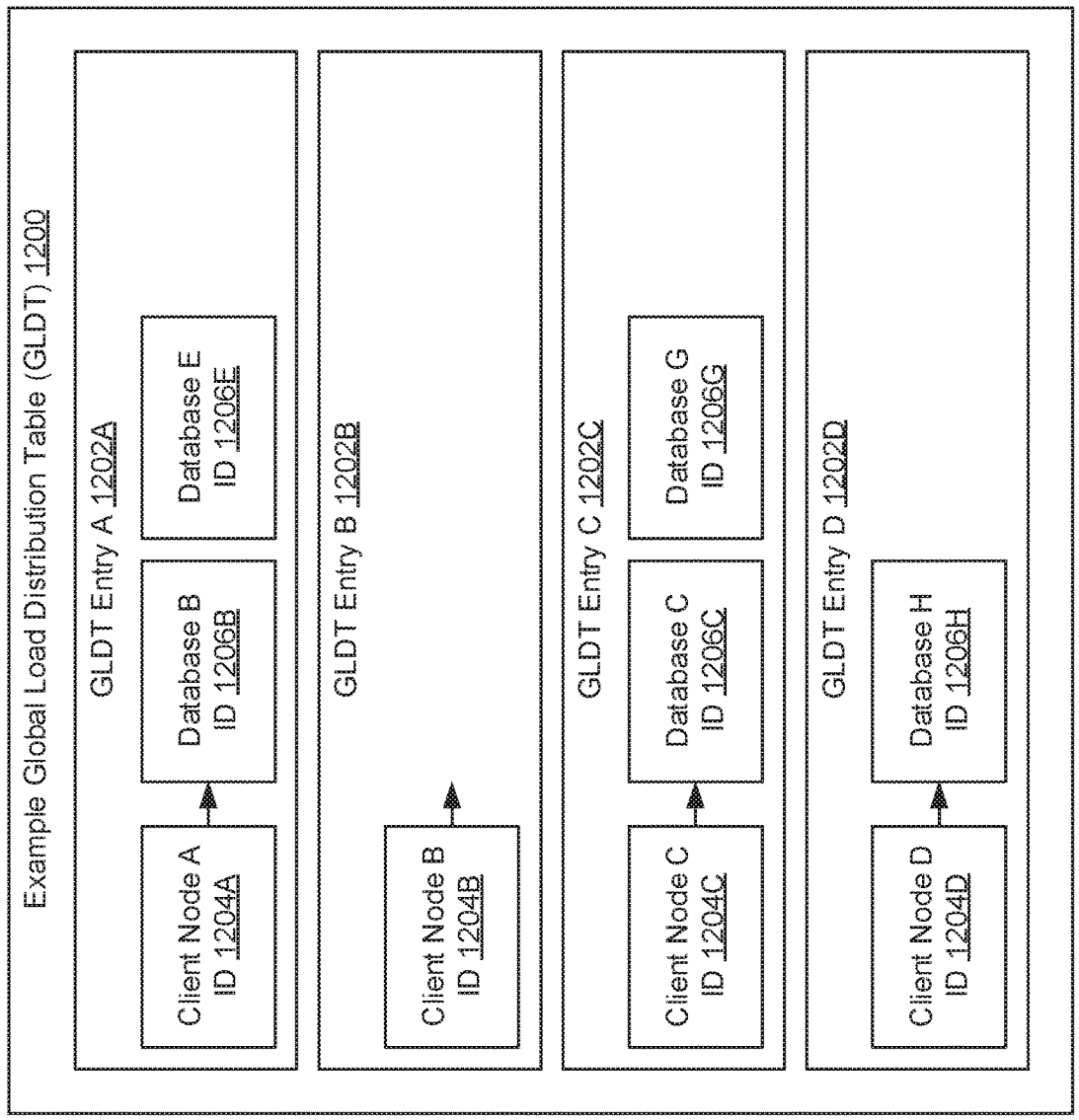

Turning to FIG. 12B, the example GLDT (1200) updates to reflect that: (i) the first target node (associated with the first client node ID (1204A)) has finished transferring over the snapshot of the first target database (associated with the first target database ID (1206A) (not shown)) and, accordingly, has commenced in transferring over a snapshot of a second target database (associated with the second database ID (1206B)) to the RBS; (ii) the second client node (associated with the second client node ID (1204B)) has finished transferring over the snapshot of the sixth target database (associated with the sixth database ID (1206F) (not shown)) and, accordingly, has completed processing its assigned workload; (iii) the third client node (associated with the third client node ID (1204C)) is still transferring over the snapshot of the third target database (associated with the third database ID (1206C)); and (iv) the fourth client node (associated with the fourth client node ID (1204D)) has finished transferring over the snapshot of the fourth target database (associated with the fourth database ID (1206D) (not shown)) and, accordingly, has commenced in transferring over a snapshot of a eighth target database (associated with the eighth database ID (1206H)).

Figure 12C:
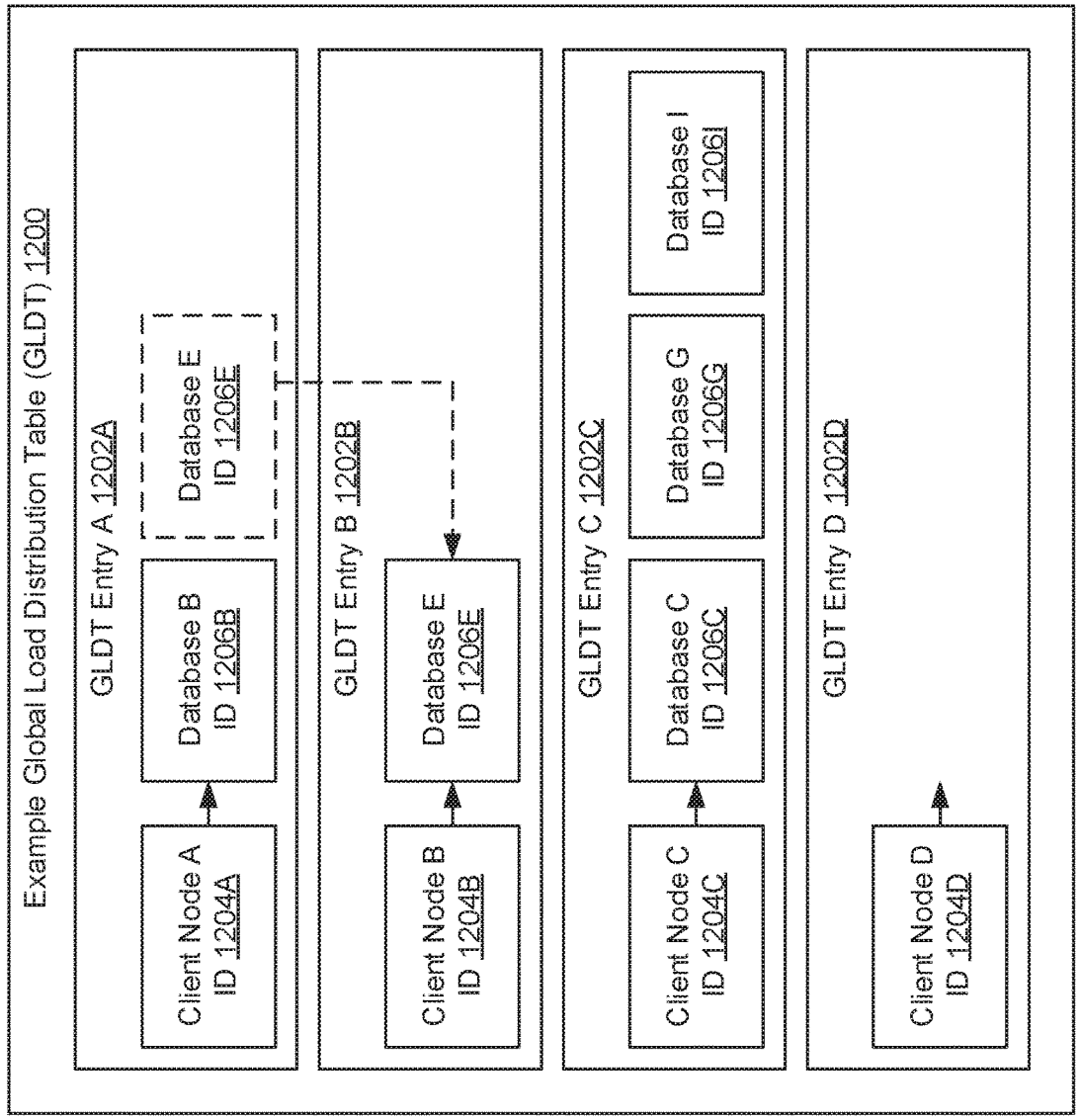

Turning to FIG. 12C, the example GLDT (1200) updates to reflect that: (i) the first client node (associated with the first client node ID (1204A)) is still transferring over the snapshot of the second target database (associated with the second database ID (1206B); (ii) the second client node (associated with the second client node ID (1204B)) has assumed the transferring over of a snapshot of a fifth target database (associated with the fifth database ID (1206E)) to the RBS, which had previously been enqueued for the first client node to process; (iii) the third client node (associated with the third client node ID (1204C)) is still transferring over the snapshot of the third target database (associated with the third database ID (1206C), where the snapshot rollover for a new database backup operation directed to a ninth target database (associated with a ninth database ID (12061)) has been enqueued for the third client node to process; and (iv) the fourth client node (associated with the fourth client node ID (1204D)) has finished transferring over the snapshot of the eighth target database (associated with the eighth database ID (1206H) (not shown)) and, accordingly, has completed processing its assigned workload.

Figure 12D:
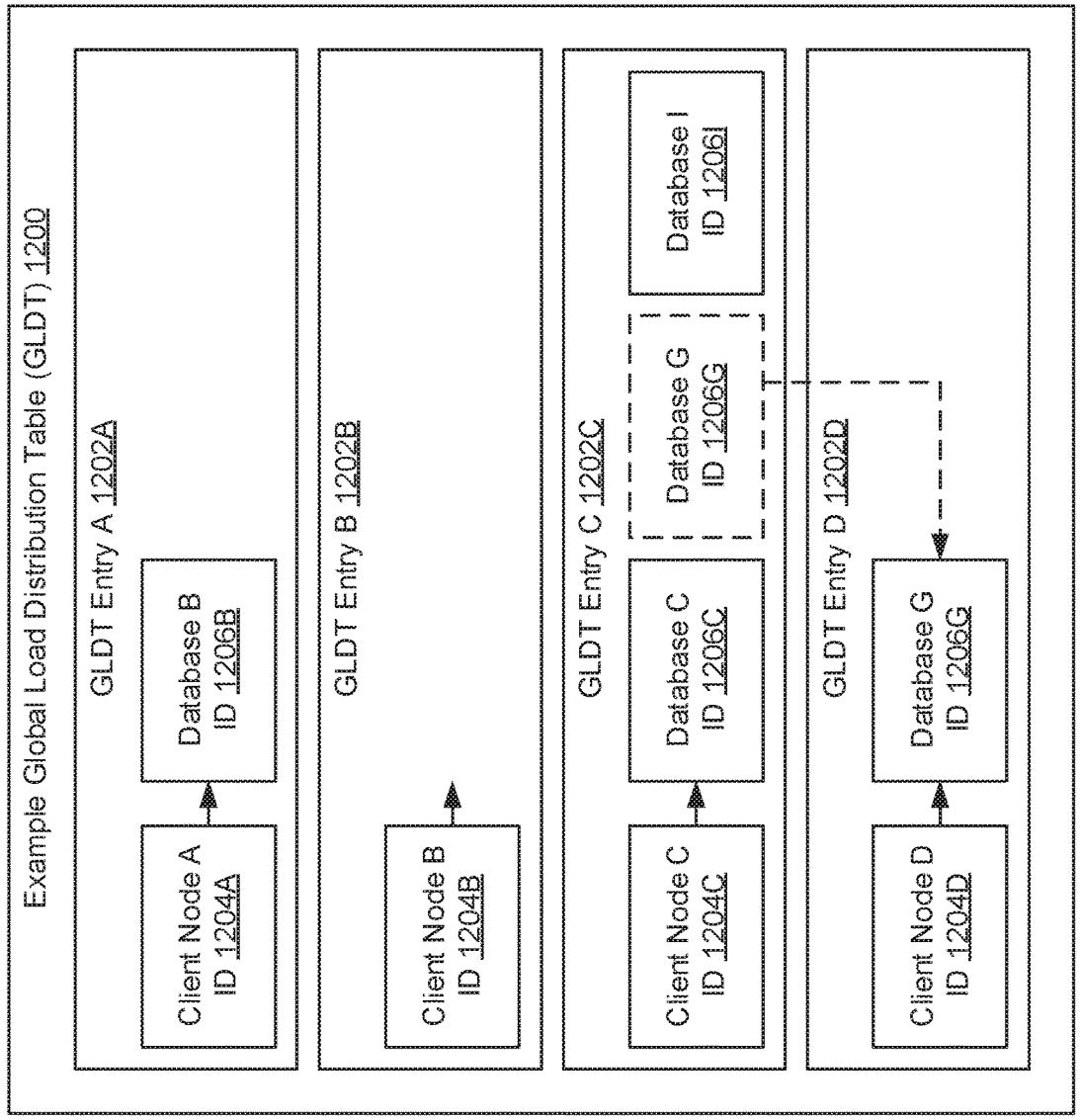

Turning to FIG. 12D, the example GLDT (1200) updates to reflect that: (i) the first client node (associated with the first client node ID (1204A)) is still transferring over the snapshot of the second target database (associated with the second database ID (1206B)); (ii) the second client node (associated with the second client node ID (1204B)) has finished transferring over the snapshot of the fifth target database (associated with the fifth database ID (1206E) (not shown)) and, accordingly, has completed processing its assigned workload; (iii) the third client node (associated with the third client node ID (1204C)) is still transferring over the snapshot of the third target database (associated with the third database ID (1206C)); and (iv) the fourth client node (associated with the fourth client node ID (1204D)) has assumed the transferring over of a snapshot of a seventh target database (associated with the seventh database ID (1206G)), which had previously been enqueued for the third client node to process.

Figure 12E:
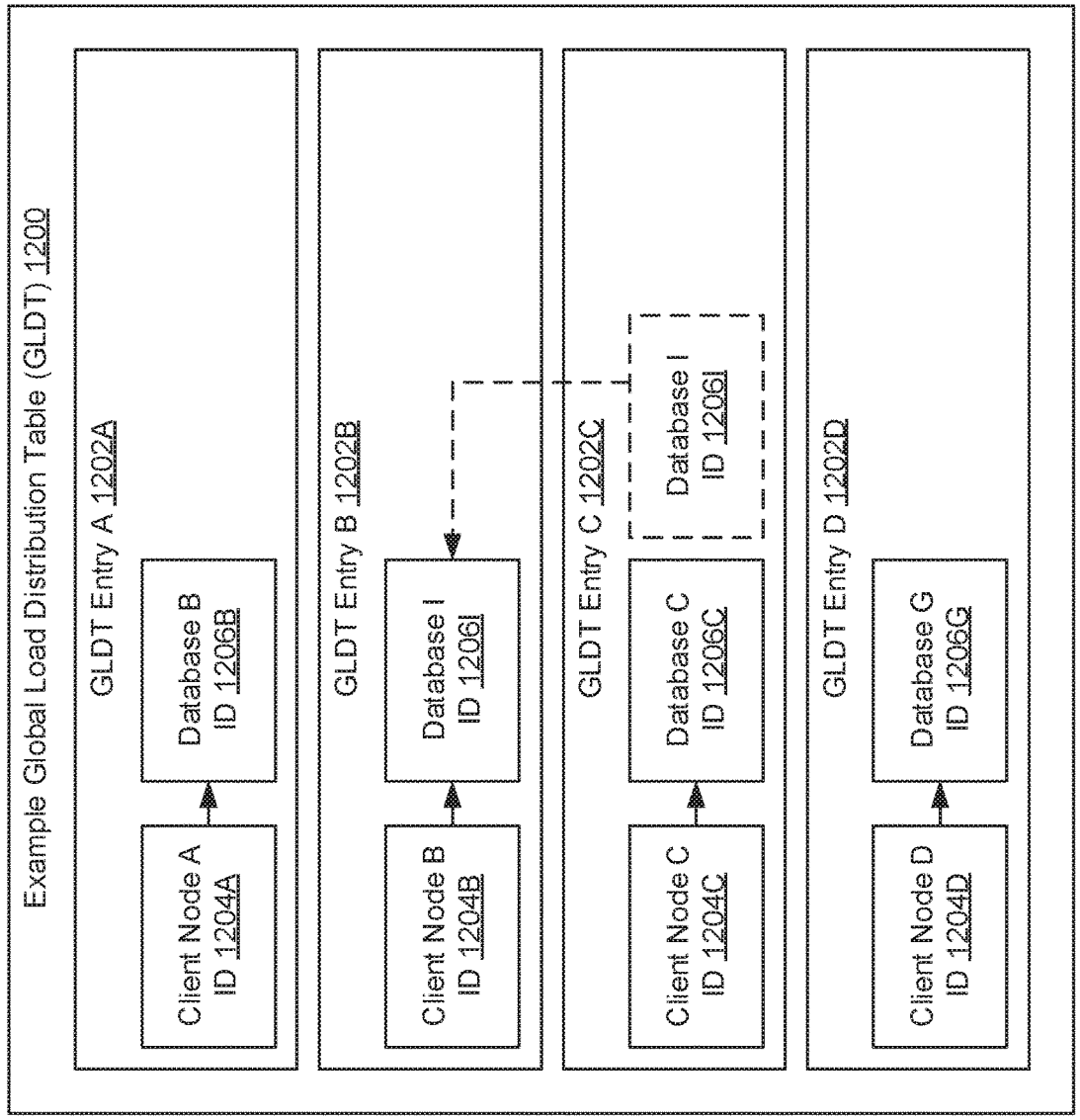

Turning to FIG. 12E, the example GLDT (1200) updates to reflect that: (i) the first client node (associated with the first client node ID (1204A)) is still transferring over the snapshot of the second target database (associated with the second database ID (1206B)); (ii) the second client node (associated with the second client node ID (1204B)) has assumed the transferring over of a snapshot of a ninth target database (associated with the ninth database ID (12061)), which had previously been enqueued for the third client node (associated with the third client node ID (1204C)) to process; (iii) the third client node is still transferring over the snapshot of the third target database (associated with the third database ID (1206C)); and the fourth client node (associated with the fourth client node ID (1204D)) is still transferring over the snapshot of the seventh target database (associated with the seventh database ID (1206G)).

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for performing database backup operations, comprising:
    receiving, for a first database backup operation involving a first target database, a first database backup initialization instruction comprising a first target database identifier (ID) associated with the first target database;
    in response to receiving the first database backup initialization instruction:
        obtaining a first protection availability index (PAI) for a local client node;
        obtaining a second PAI for a first remote client node and a third PAI for a second remote client node;
        making a first determination that the first PAI exceeds the second PAI and the third PAI; and
        based on the first determination:
            performing a first backup operation stage of the first database backup operation involving the first target database.

2. The method of claim 1, wherein the first PAI quantifies an availability of resources on the local client node for performing the first backup operation stage.

3. The method of claim 1, wherein the first backup operation stage is one of a plurality of backup operation stages required to be performed to complete the first database backup operation involving the first target database.

4. The method of claim 1, further comprising:
    obtaining, from performing the first backup operation stage, a first backup operation stage output;
    making a second determination that the first database backup operation is incomplete;
    based on the second determination:
        obtaining a fourth PAI for the local client node;
        obtaining a fifth PAI for the first remote client node and a sixth PAI for the second remote client node;
        making a third determination that the fifth PAI exceeds the fourth PAI and the sixth PAI;
        based on the third determination:
            generating a backup operation stage package using the first target database ID, the first backup operation stage output, and a backup operation stage ID associated with the first backup operation stage; and
            transmitting the backup operation stage package to the first remote client node.

5. The method of claim 1, further comprising:
    obtaining, from performing the first backup operation stage, a first backup operation stage output;
    making a second determination that the first database backup operation is incomplete;
    based on the second determination:
        obtaining a fourth PAI for the local client node;
        obtaining a fifth PAI for the first remote client node and a sixth PAI for the second remote client node;
        making a third determination that the fourth PAI exceeds the fifth PAI and the sixth PAI; and
        based on the third determination:
            performing, using the first backup operation stage output, a second backup operation stage of the first database backup operation involving the first target database.

6. The method of claim 5, further comprising:
    receiving, based at least on the fourth PAI and from the second remote client node, a backup operation stage package comprising a second target database ID associated with a second target database, a backup operation stage output, and a backup operation stage ID associated with a second backup operation stage of a second database backup operation involving the second target database;
    identifying, based on the backup operation stage ID, a third backup operation stage to perform of the second database backup operation; and performing, using at least the backup operation stage output, the third backup operation stage of the second database backup operation involving the second target database.

7. The method of claim 1, further comprising:
receiving, for a second database backup operation involving a second target database, a second database backup initialization instruction comprising a second target database identifier (ID) associated with the second target database;
in response to receiving the second database backup initialization instruction:
  obtaining a fourth PAI for the local client node;
  obtaining a fifth PAI for the first remote client node and a sixth PAI for the second remote client node;
  making a second determination that the fifth PAI exceeds the fourth PAI and the sixth PAI;
  based on the second determination:
    generating a backup operation stage package using the second target database ID, and a backup operation stage ID associated with a first backup operation stage of the second database backup operation; and
    transmitting the backup operation stage package to the first remote client node.

8. The method of claim 1, further comprising:
receiving a remote index query from the second remote client node;
in response to receiving the remote index query:
  obtaining a fourth PAI for the local client node;
  generating a remote index response using a client node ID associated with the local client node, and the fourth PAI; and
  transmitting the remote index response to the second remote client node.

9. A system, comprising:
a plurality of databases; and
a plurality of client nodes operatively connected to the plurality of databases and one another,
wherein the plurality of client nodes comprises a local client node, a first remote client node, and a second remote client node,
wherein the local client node is programmed to:
  receive, for a first database backup operation involving a first target database of the plurality of databases, a first database backup initialization instruction comprising a first target database identifier (ID) associated with the first target database;
  in response to receiving the first database backup initialization instruction:
    obtain a first protection availability index (PAI) for the local client node;
    obtain a second PAI for the first remote client node from the first remote client node and a third PAI for the second remote client node from the second remote client node;
    make a first determination that the first PAI exceeds the second PAI and the third PAI; and
    based on the first determination:
      perform a first backup operation stage of the first database backup operation involving the first target database.

10. The system of claim 9, wherein each client node of the plurality of client nodes comprises a data backup agent (DBA) responsible for at least managing database backup operations on their respective client node.

11. The system of claim 10, wherein each client node of the plurality of client nodes further comprises a load balancing service (LBS) operatively connected to the DBA, and responsible for at least load balancing database backup operations across the plurality of client nodes.

12. The system of claim 11, wherein each client node of the plurality of client nodes further comprises a process monitoring service (PMS) operatively connected to the LBS, and responsible for determining PAIs for their respective client node.

13. A non-transitory computer readable medium (CRM) comprising computer readable program code, which when executed by a computer processor, enables the computer processor to:
receive, for a first database backup operation involving a first target database, a first database backup initialization instruction comprising a first target database identifier (ID) associated with the first target database;
in response to receiving the first database backup initialization instruction:
  obtain a first protection availability index (PAI) for a local client node;
  obtain a second PAI for a first remote client node and a third PAI for a second remote client node;
  make a first determination that the first PAI exceeds the second PAI and the third PAI; and
  based on the first determination:
    perform a first backup operation stage of the first database backup operation involving the first target database.

14. The non-transitory CRM of claim 13, wherein the first PAI quantifies an availability of resources on the local client node for performing the first backup operation stage.

15. The non-transitory CRM of claim 13, wherein the first backup operation stage is one of a plurality of backup operation stages required to be performed to complete the first database backup operation involving the first target database.

16. The non-transitory CRM of claim 13, further comprising computer readable program code, which when executed by the computer processor, enables the computer processor to:
obtain, from performing the first backup operation stage, a first backup operation stage output;
make a second determination that the first database backup operation is incomplete;
based on the second determination:
  obtain a fourth PAI for the local client node;
  obtain a fifth PAI for the first remote client node and a sixth PAI for the second remote client node;
  make a third determination that the fifth PAI exceeds the fourth PAI and the sixth PAI;
  based on the third determination:
    generate a backup operation stage package using the first target database ID, the first backup operation stage output, and a backup operation stage ID associated with the first backup operation stage; and
    transmit the backup operation stage package to the first remote client node.

17. The non-transitory CRM of claim 13, further comprising computer readable program code, which when executed by the computer processor, enables the computer processor to:
obtain, from performing the first backup operation stage, a first backup operation stage output;

make a second determination that the first database backup operation is incomplete;
based on the second determination:
obtain a fourth PAI for the local client node;
obtain a fifth PAI for the first remote client node and a sixth PAI for the second remote client node;
make a third determination that the fourth PAI exceeds the fifth PAI and the sixth PAI; and
based on the third determination:
perform, using the first backup operation stage output, a second backup operation stage of the first database backup operation involving the first target database.

18. The non-transitory CRM of claim 13, further comprising computer readable program code, which when executed by the computer processor, enables the computer processor to:
receive, for a second database backup operation involving a second target database, a second database backup initialization instruction comprising a second target database identifier (ID) associated with the second target database;
in response to receiving the second database backup initialization instruction:
obtain a fourth PAI for the local client node;
obtain a fifth PAI for the first remote client node and a sixth PAI for the second remote client node;
make a second determination that the fifth PAI exceeds the fourth PAI and the sixth PAI;
based on the second determination:
generate a backup operation stage package using the second target database ID, and a backup operation stage ID associated with a first backup operation stage of the second database backup operation; and
transmit the backup operation stage package to the first remote client node.

19. The non-transitory CRM of claim 13, further comprising computer readable program code, which when executed by the computer processor, enables the computer processor to:
receive a remote index query from the second remote client node;
in response to receiving the remote index query:
obtain a fourth PAI for the local client node;
generate a remote index response using a client node ID associated with the local client node, and the fourth PAI; and
transmit the remote index response to the second remote client node.

20. The non-transitory CRM of claim 19, further comprising computer readable program code, which when executed by the computer processor, enables the computer processor to:
receive, based at least on the fourth PAI and from the second remote client node, a backup operation stage package comprising a second target database ID associated with a second target database, a backup operation stage output, and a backup operation stage ID associated with a second backup operation stage of a second database backup operation involving the second target database;
identify, based on the backup operation stage ID, a third backup operation stage to perform of the second database backup operation; and
perform, using at least the backup operation stage output, the third backup operation stage of the second database backup operation involving the second target database.

* * * * *